(12) United States Patent
Geist et al.

(10) Patent No.: US 11,180,112 B2
(45) Date of Patent: Nov. 23, 2021

(54) SWITCHABLE RETRACTOR

(71) Applicant: Indiana Mills & Manufacturing, Inc., Westfield, IN (US)

(72) Inventors: Christopher Geist, Westfield, IN (US); Guy R. Dingman, Star City, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 371 days.

(21) Appl. No.: 16/408,573

(22) Filed: May 10, 2019

(65) Prior Publication Data

US 2019/0263352 A1     Aug. 29, 2019

Related U.S. Application Data

(62) Division of application No. 15/353,792, filed on Nov. 17, 2016, now Pat. No. 10,328,894.

(60) Provisional application No. 62/258,020, filed on Nov. 20, 2015.

(51) Int. Cl.
    B60R 22/34     (2006.01)
    B60N 2/28      (2006.01)

(52) U.S. Cl.
    CPC ............ B60R 22/3416 (2013.01); B60N 2/28 (2013.01); B60N 2/2806 (2013.01); B60N 2002/2815 (2013.01); B60R 2022/3421 (2013.01)

(58) Field of Classification Search
    CPC ............... B60R 22/34; B60R 22/3416; B60R 2022/3421; B60N 2/28; B60N 2/2806; B60N 2002/2815
    See application file for complete search history.

(56) References Cited

U.S. PATENT DOCUMENTS

| | | |
|---|---|---|
| 3,550,875 A | 12/1970 | Settimi |
| 3,771,814 A | 11/1973 | Hahn |
| 3,809,332 A | 5/1974 | Hayashi |
| 6,024,408 A | 2/2000 | Bello et al. |
| 7,159,948 B1 | 1/2007 | Wolf |
| 7,278,684 B2 | 10/2007 | Boyle |
| 7,837,275 B2 | 11/2010 | Woellert et al. |
| 8,328,281 B2 | 12/2012 | Balensiefer, II et al. |
| 8,444,222 B2 | 5/2013 | Buckingham et al. |
| 10,328,894 B2 * | 6/2019 | Geist .................. B60R 22/3416 |
| 2006/0249617 A1 | 11/2006 | Cardona |

* cited by examiner

*Primary Examiner* — Sang K Kim
(74) *Attorney, Agent, or Firm* — Woodard, Emhardt, Henry, Reeves & Wagner, LLP

(57) ABSTRACT

A switchable retractor system includes a retractor with a spool. The spool is rotatable in an extension direction for extending a web and in a retraction direction for retracting the web. A first clutch has an engaged state where the first clutch inhibits rotation of the spool in the extension direction and a disengaged state where the first clutch allows rotation of the spool in the extension direction. A release actuator actuates the first clutch into the disengaged state when actuated by a user to allow extension of the web. A second clutch has a locked state where the second clutch inhibits rotation of the spool in the retraction direction and an unlocked state where the second clutch allows rotation of the spool in the retraction direction. A tension actuator actuates the second clutch into the unlocked state when actuated to allow retraction of the web into the retractor.

19 Claims, 17 Drawing Sheets

SWITCHABLE RETRACTOR

CROSS REFERENCE TO RELATED APPLICATION

This application is a divisional of U.S. application Ser. No. 15/353,792 filed Nov. 17, 2016, which claims the benefit of U.S. Provisional Application No. 62/258,020 filed Nov. 20, 2015, which are hereby incorporated by reference.

FIELD OF THE INVENTION

The present invention relates generally to the field of retractors and connectors, such as for anchoring a child seat.

BACKGROUND

Installing car seats can be a difficult and frustrating process. Since not all car seats are the same, adjustments are typically required when the car seat is installed. In one configuration, a web for securing the car seat is attached to mini latch connectors that are used to secure the car seat to anchor bights in the vehicle. The web typically includes an adjustment mechanism that allows slackening and tightening of the web. The additional slack in the web helps to make it easier to install the mini-latch connectors. However, this slack needs to be removed when the car seat is used so that the web is tight in order to properly secure the car seat. The process of slackening and tightening the web can be a difficult and labor-intensive process. Thus, there is a need for improvement in this field.

BRIEF DESCRIPTION OF THE DRAWINGS

While the specification concludes with claims that particularly point out and distinctly claim this technology, it is believed this technology will be better understood from the following description of certain examples taken in conjunction with the accompanying drawings, in which like reference numerals identify the same elements.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the disclosure and claims.

Figure 1:
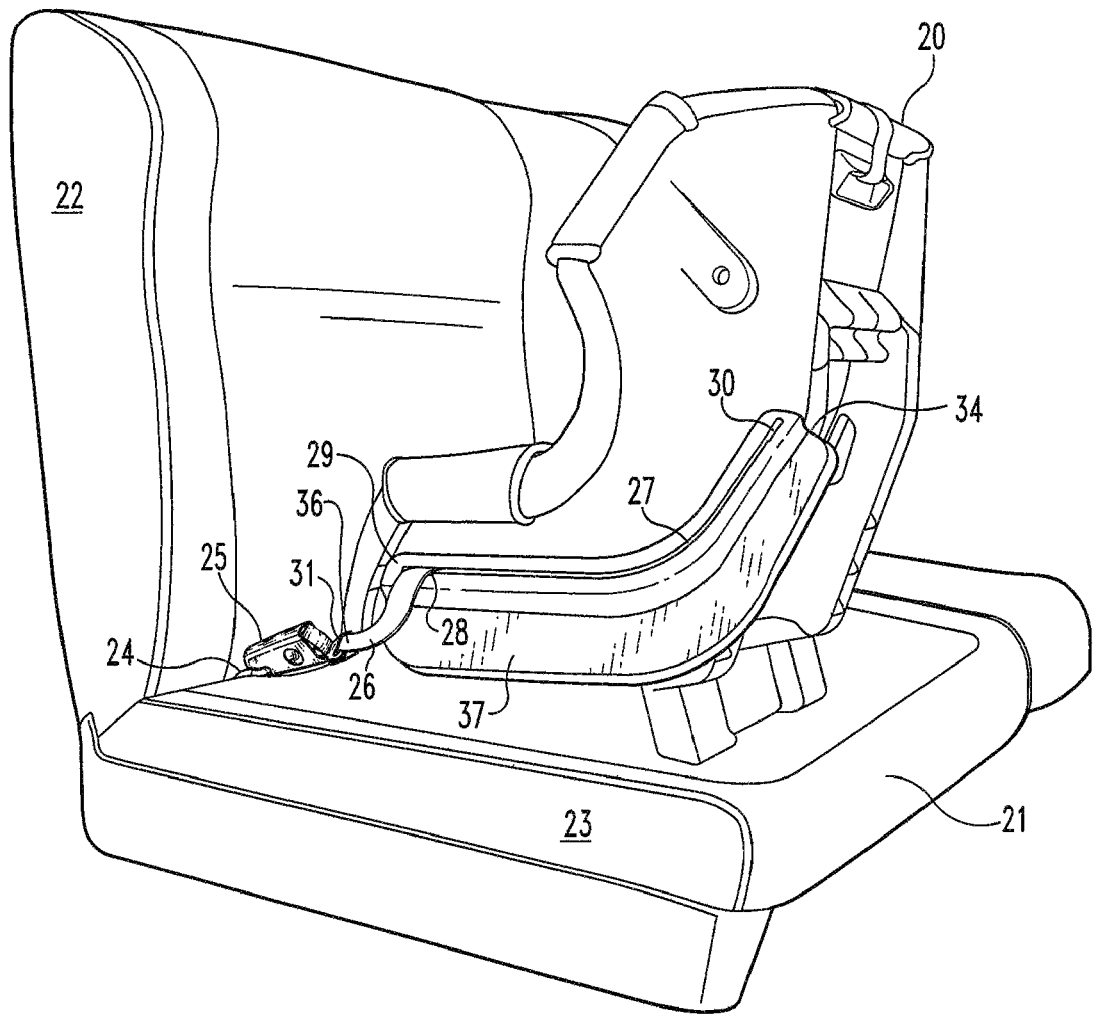
FIG. 1 is a perspective view of a child seat facing rearwardly atop a vehicle passenger seat, showing an exemplary connector, including an exemplary retractor, affixed to a load-bearing member of the child seat.

As shown in FIG. 1, exemplary child seat 20 with which the disclosed retractors may be used is mounted atop a vehicle passenger seat 21 consisting of a seat back portion 22 and a seat portion 23. A conventional anchor bight 24 is located at the intersection of the seat back portion 22 and seat portion 23. A connector 25 mounted to one end 36 of web 26 and is lockingly engageable with bight 24. Web 26 has an opposite end mounted to a conventional automatic locking retractor (ALR) slidably mounted to child seat 20 and concealed within retractor housing 37 mounted to the side of the child seat. Housing 37 has a slot 27 with an enlarged opening 28 located at housing end 29 and an enlarged opening 30 located at housing end 34. Web end 36 is attached to connector flange 31 with the web end extending through an opening in the flange and being doubled back and fixedly attached to the main body of the web.

Slot 27 has a width greater than the thickness of web 26 but less than the thickness of flange 31 or the combined thickness of flange 31 with the attached web 26. Openings 28 and 30 each have a width greater than either the thickness of flange 31 or the combined thickness of flange 31 and the attached web 26. Thus, the retractor within housing 37 can withdraw both the web 26 and flange 31 into housing 37 when flange 31 is located at openings 28 or 30; however, web 26 may be moved along slot 27 between the opposite enlarged openings while flange 31 remains external to the retractor housing 37.

Figure 2:
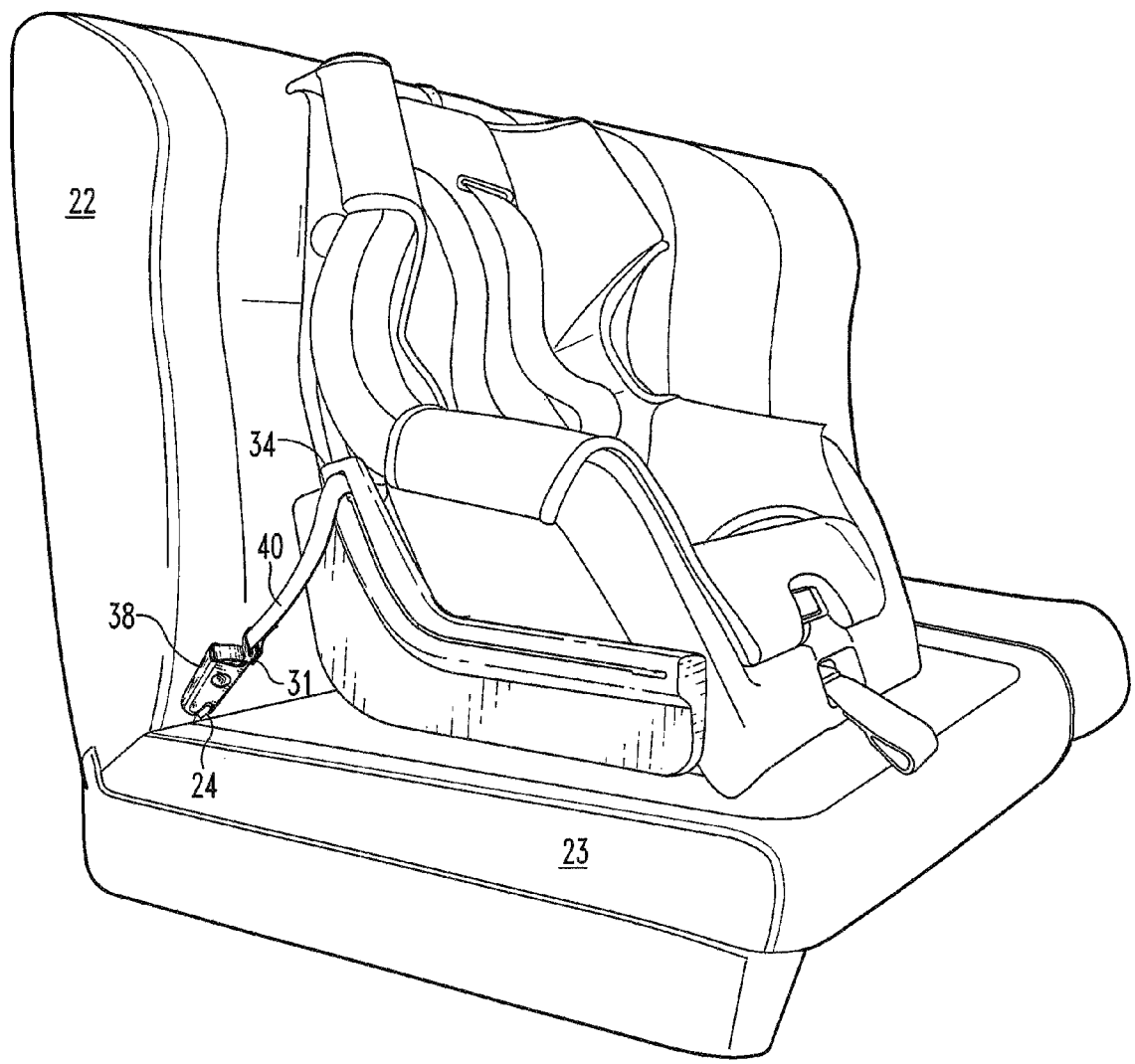
FIG. 2 is a perspective view of the child seat of FIG. 1 facing forwardly atop the vehicle passenger seat of FIG. 1, showing the connector of FIG. 1 affixed to a load-bearing member of the child seat.
Figure 3:
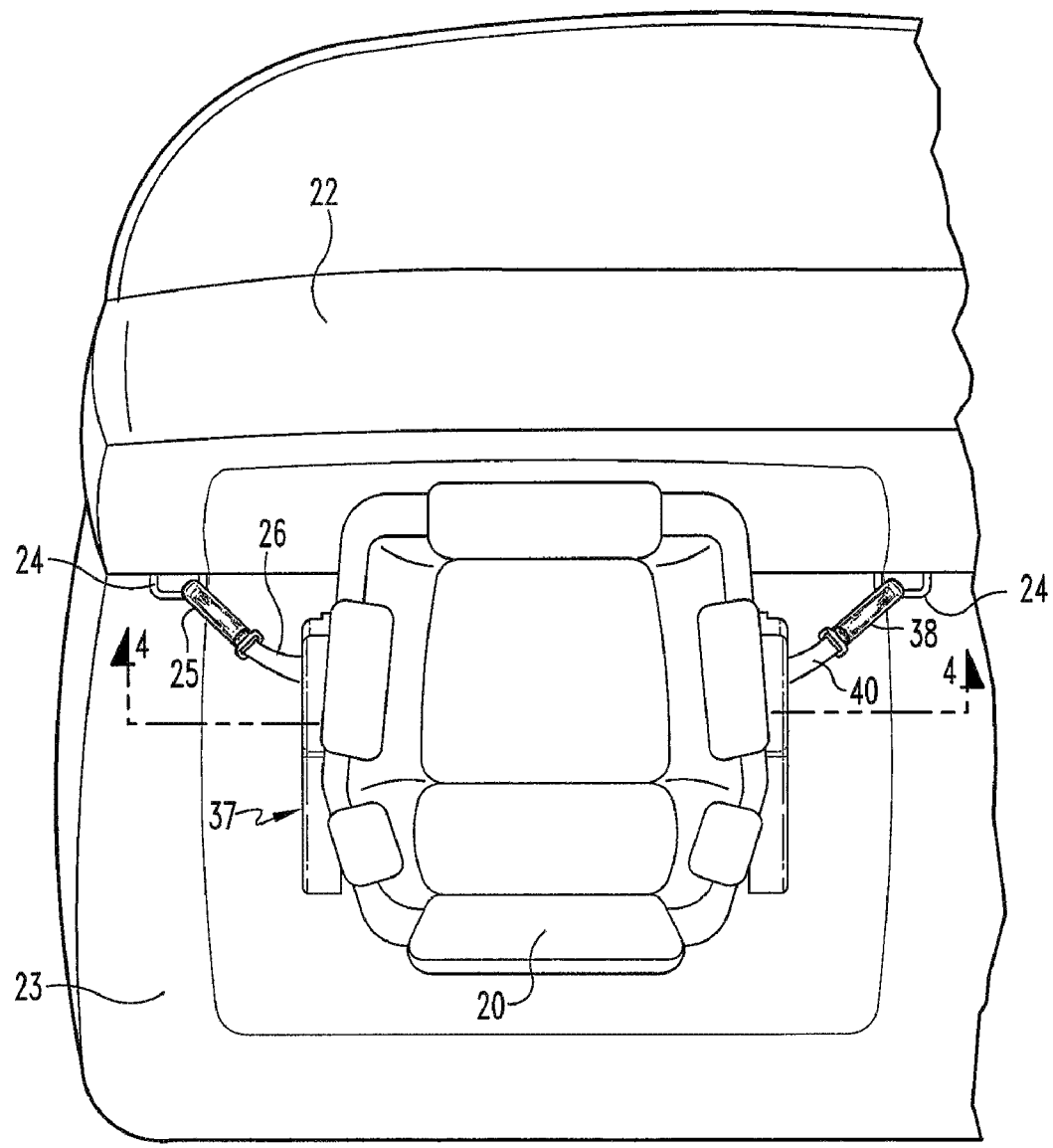
FIG. 3 is a top view of the child seat of FIG. 1.

When child seat 20 is facing forward (FIG. 2) on the vehicle seat, web 26 extends outwardly from opening 30 whereas with the child seat facing rearwardly (FIG. 1) on the vehicle seat, web 26 extends outwardly from opening 28. In the event that the child seat 20 is changed from facing forward to rearward, then web 26 is moved from opening 30 along slot 27 to opening 28, whereas the web is moved in an opposite direction if the child seat 20 is to be moved from facing rearward to facing forward. When the child seat is not mounted to the vehicle seat, the retractor within housing 37 withdraws web 26 positioning and holding connector 25 at either opening 28 or 30 with flange 31 extending into opening 28 or 30 preventing the connector 25 and web 26 from dangling from the child seat 20 allowing the child seat 20 to be carried without fear of the connector 25 and web 26 snaring an external object. Other features of retractors and connectors, among other components as described in U.S. Pat. No. 8,328,281 ("the '281 patent"), may be utilized. The '281 patent is incorporated herein by reference in its entirety.

FIGS. 4-7 show an exemplary retractor 100 that may be incorporated into a connector, such as one of the connectors 25 or 38 described above, and utilized to anchor a child seat to a vehicle passenger seat, whether in a rear- or front-facing configuration, or other configurations. It will be further understood that a connector utilizing retractor 100 may be used to secure a base of a modular car seat (for example, one that includes a car seat removably attached to the base, but where the base remains in the car at essentially all times). In the present example, rather than utilizing two connectors, such as connectors 25 and 38, a single connector incorporating retractor 100 may utilized. While a web is not shown in FIGS. 4-7, it will be understood that retractor 100 is operable to extract and retract a web, such as web 26, 40 described above, from a connector. In the example shown, retractor 100 includes a locking mechanism that substantially prevents retraction of the web during extraction of the web from the retractor 100 as is discussed further herein. Retractor 100 also includes a locking mechanism that substantially prevents extraction of the web from the retractor during retraction of the web back into the retractor. Such mechanisms are discussed in further detail below.

As shown, retractor 100 includes a primary spool 102, a primary pawl 104, a main or spool spring 106 housed in a housing 108, and a primary or release button 110. A support member or frame 112 operably couples primary button 110 with primary pawl 104 and primary spool 102. As shown, support member 112 includes a bottom flange 114 and opposing side flanges 116a, 116b. Side flange 116a includes a top flange 118 extending toward side flange 116b. Side flange 116b includes a generally rectangular aperture 120. Top flange 118 includes a circular aperture 122, while bottom flange 114 includes a corresponding circular aperture 124 that is coaxial with aperture 122. A stability member 119 connects flanges 116a, 116b.

As shown, primary button 110 includes a main body portion 126 with opposing arms 128, 130 extending laterally from each side of main body portion 126. Arm 128 includes an upper peg 132 and a lower peg (not shown) that are configured to be pivotably received in apertures 122, 124, respectively. Arm 130 includes an extension member 134 extending perpendicularly thereto. As shown best in FIGS. 4-6, arm 130 and extension member 132 are received within aperture 120. Thus, button 110 may pivot about an axis defined by peg 132 but is limited to pivoting along a particular arc length or angular displacement due to the interaction between extension member 134 and aperture 120. In the example shown, button 110 may pivot between outward and inward positions relative to primary spool 102. In other examples, rather than pivoting, button 110 may be configured to move in other manners or in a combination of other manners, such as translating, or translating and pivoting, or exhibiting other movements that will be apparent to a person skilled in the art in view of the teachings herein.

Retractor 100 of the present example includes a torsion spring 136 which biases the button into an extended position (i.e., away from first pawl 104). Particularly, one arm 138 of torsion spring 136 is received in an aperture (140) (best shown in FIGS. 4-7) in side flange 116a while the other arm 142 of torsion spring 136 is engaged with main body portion 126. Thus when button 110 is pushed in the direction of arrow 143 (FIG. 5) with a sufficient force to overcome the biasing force of torsion spring 136, button 110 may move towards primary pawl 104. However, once the user releases the sufficient force, the button 110 will return to the extended position.

Figure 4:
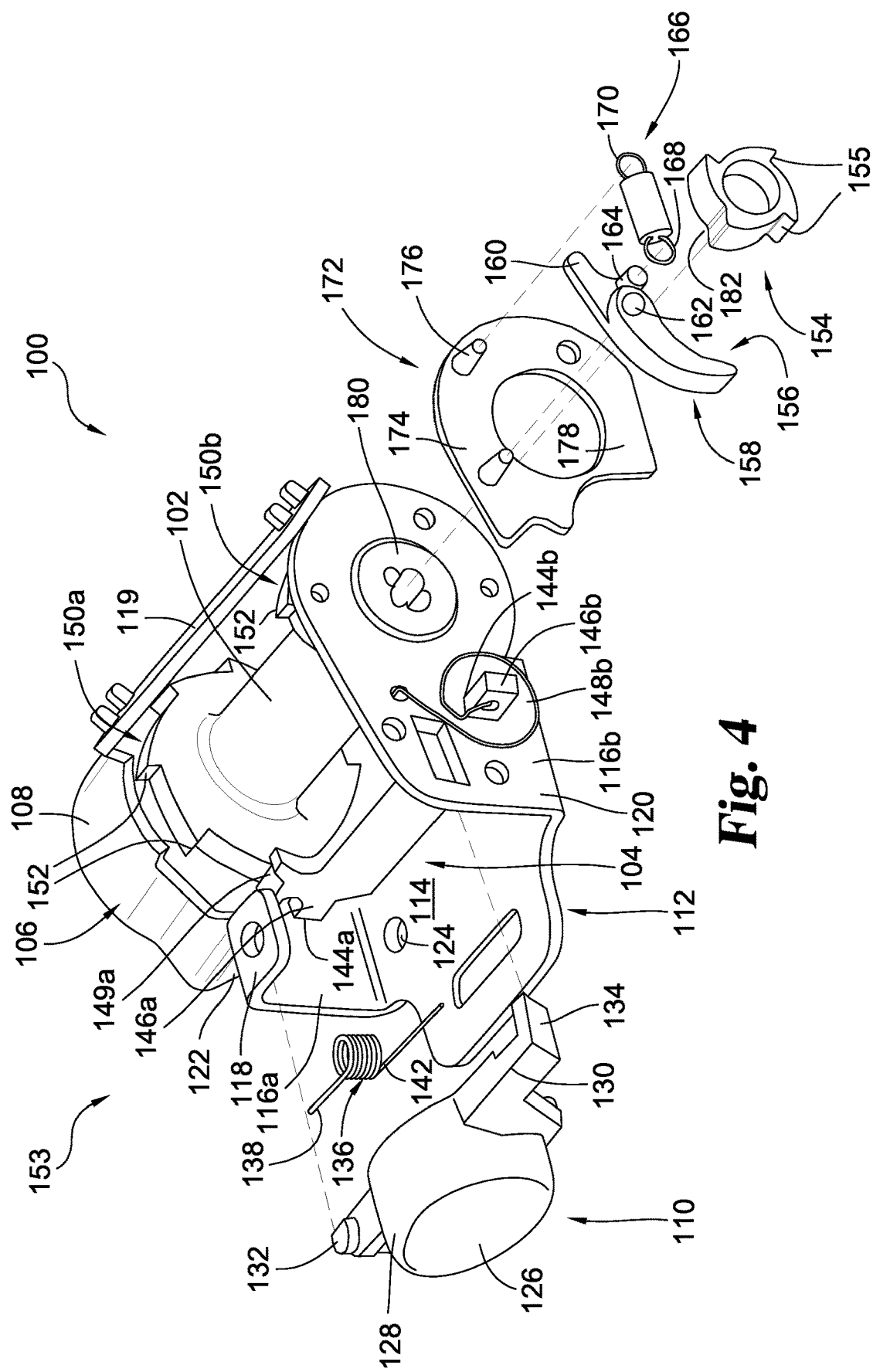
FIG. 4 is an exploded view of an exemplary retractor that is suitable for incorporation into a connector, such as the connector shown in FIG. 1.
Figure 5:
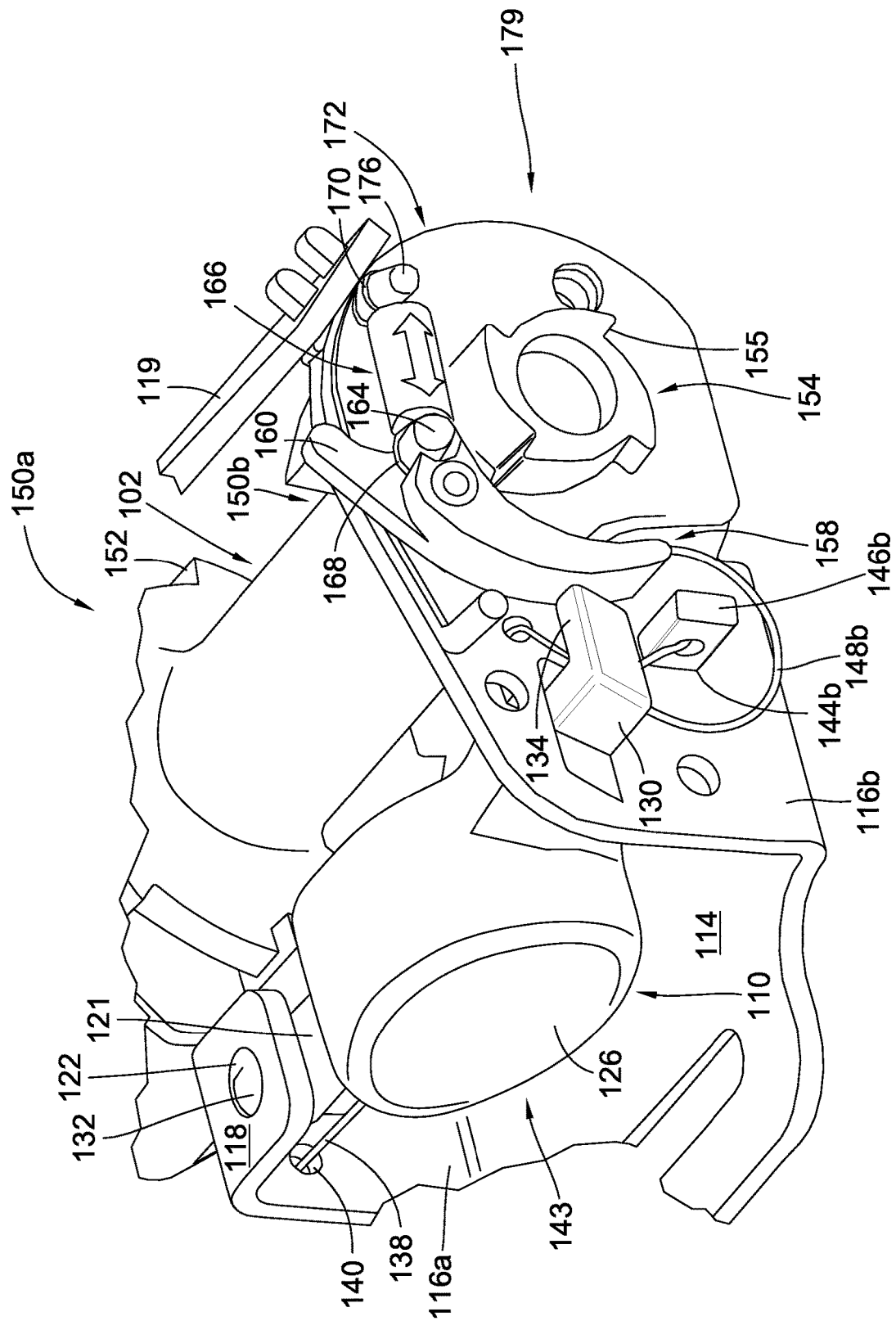
FIG. 5 is a detailed perspective view of the retractor of FIG. 4, showing a push button of the retractor engaging first and second pawls of the retractor.

Primary spool 102 includes a first end 150a rotatably coupled to side flange 116a and a second end 150b rotatably coupled to side flange 116b. As shown, primary spool 102 includes a plurality of circumferentially disposed teeth 152. Support member 112 further includes opposing side apertures 144a, 144b in side flanges 116a, 116b. Primary pawl 104 includes opposing arms 146a, 146b, a portion of which are each pivotably received in respective apertures 144a, 144b. Each of arms 146a, 146b is operably coupled to a resilient member 148b, which biases primary pawl 104 into engagement with one of teeth 152 of primary spool 102. Primary pawl 104 further includes engagement members 149a extending generally transversely relative to the rest of primary pawl (e.g., arms 146a, 146b) that are biased into engagement with teeth 152 of primary pawl 104. Together the primary pawl 104 and the teeth 152 on the spool 102, form a primary or first clutch 153 that is normally biased to an engaged state where the first clutch 153 inhibits rotation of the spool 102 in one direction but allows rotation of the spool 102 in the opposite direction. Upon a portion of button 110 contacting primary pawl 104, primary pawl 104 pivots such that engagement members 146a, 146b are moved out of engagement with teeth 152. Thus, in the present example, primary spool 102 is configured to rotate in a first direction (clockwise as shown in FIG. 4) regardless of the position of primary pawl 104. However, as discussed in further detail below, primary spool 102 may rotate in a second direction (counterclockwise as shown) only when the primary pawl 104 has pivoted away from and is out of engagement with teeth 152 due to actuation of primary button 110.

Retractor 100 further includes a secondary spool 154 including a plurality of circumferentially oriented teeth 155. Retractor 100 further includes a pivoting member 156 defining a secondary pawl 158 on one end thereof and a secondary button 160 on a second end thereof. As shown, pivoting member 156 includes an aperture 162 and a peg 164 extending from pivoting member 156, which are both positioned between secondary pawl 158 and secondary button 160. Retractor 100 of the present example further includes a compression spring 166 including a first ring 168 and a second ring 170. As shown, the subsystem comprising pivoting member 156 compression spring 166 is "over center" such that pivoting member 156 has two stable positions: one wherein secondary pawl 156 is engaged with secondary spool 154, and one wherein they are disengaged.

As shown, retractor 100 also includes support plate 172 having a first peg 174, a second peg 176, and a generally central circular aperture 178. Support plate 172 is fixed according to any suitable method to flange 116b such that aperture 178 is coaxially positioned relative to primary spool 102. Second end 150b of primary spool 102 includes a keyed aperture 180, and secondary spool 154 includes a complementary shaped keyed portion 182 that is configured to be received within keyed aperture 180. Thus, when keyed portion 182 is received in aperture 180, as shown in FIGS. 4-7, primary and secondary spools 102, 154 may rotate in concert.

Figure 6:
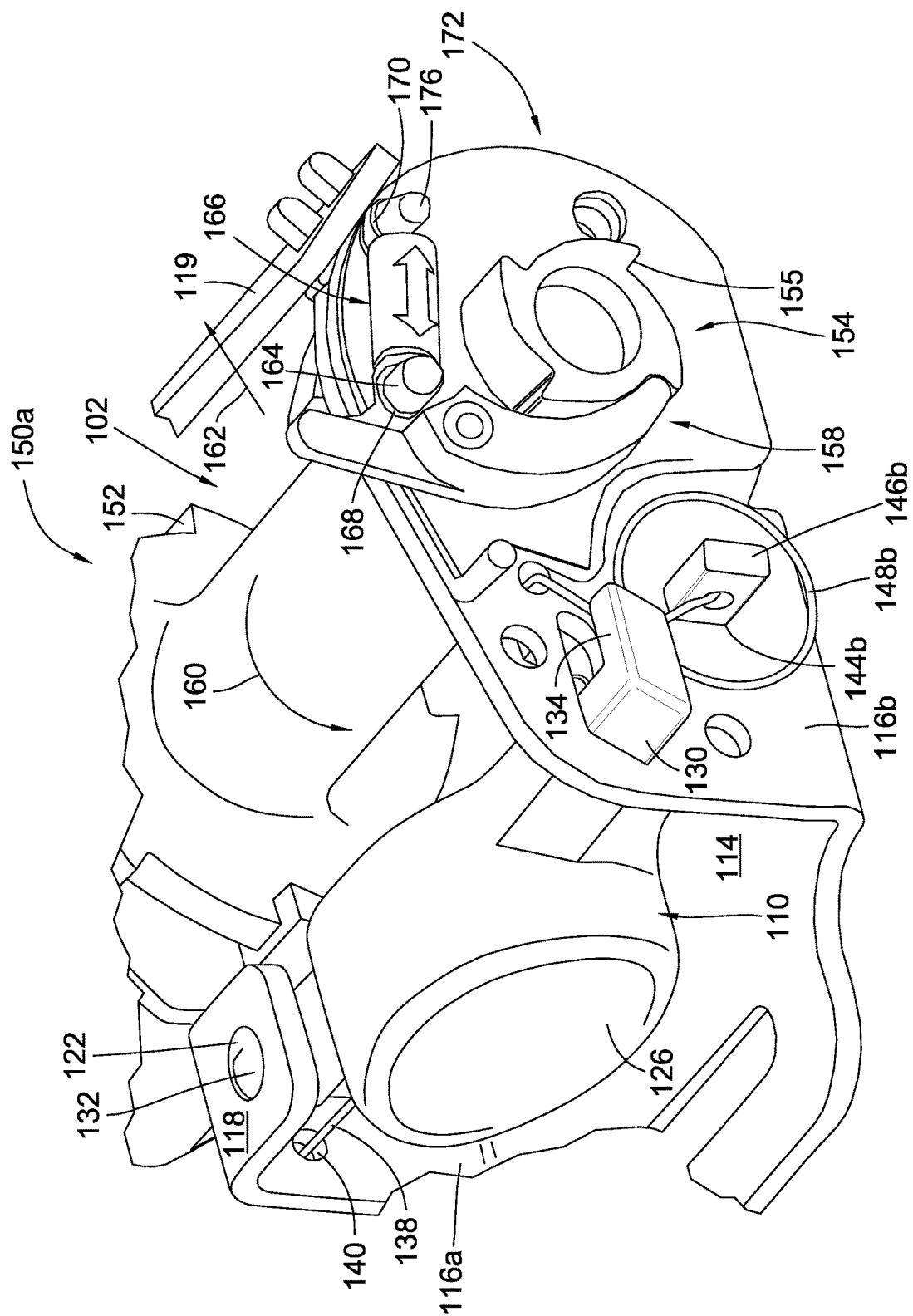
FIG. 6 is a detailed perspective view of the retractor of FIG. 4, showing the first pawl disengaged from a first spool and the second pawl engaged with a second spool, and showing the first and second spools rotating in a first direction in an install mode of the retractor.
Figure 7:
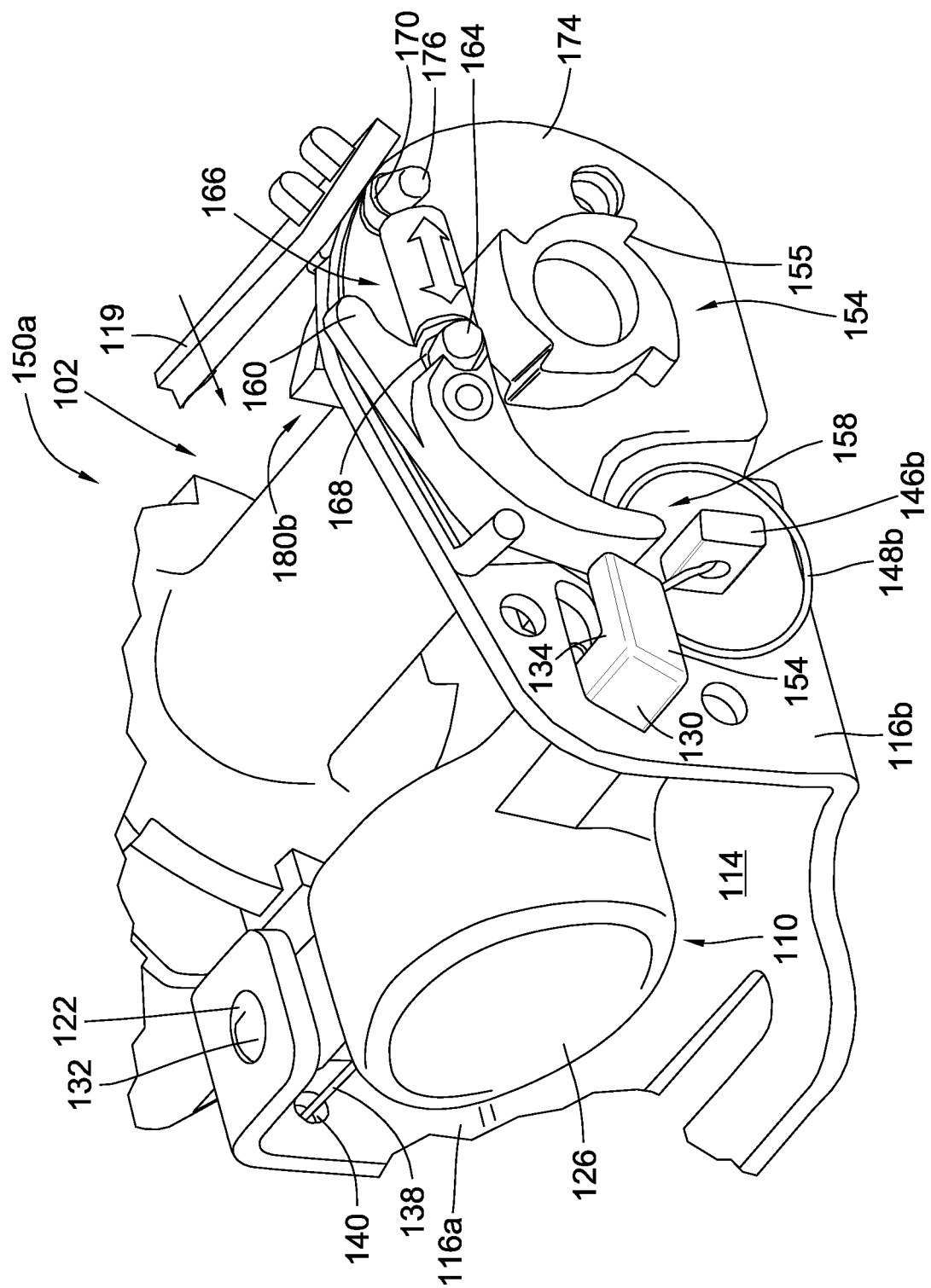
FIG. 7 is a detailed perspective view of the retractor of FIG. 4, showing the first pawl engaged with the first spool and the second pawl disengaged from the second spool, and showing the first and second spools rotating in a first direction in an install mode of the retractor.

As shown in FIGS. 4-7, peg 174 is received within aperture 162 of pivotable member 156, such that pivotable member 156 may pivot about an axis defined by peg 174. Ring 168 of compression spring 166 receives peg 164 of pivotable member 156, while ring 170 of compression spring 166 receives peg 176 of support plate 172. In the present example, as primary button 110 is advanced towards primary pawl 104, extension member 134 advances within aperture 120 and contacts secondary pawl 158 of pivotable member 156 and urges secondary pawl 158 angularly towards secondary spool 154. Additionally, due to the relative positions of peg 174 and peg 164 and the interaction between compression spring 166 and pegs 174, 176, compression spring 166 urges secondary pawl 158 angularly further towards secondary spool 154 until secondary pawl 158 engages secondary spool 154 and particularly, as secondary pawl 158 engages one of teeth 155, as shown in FIG. 6. As should be recognized, the teeth 155 of the secondary spool 154 together with the secondary pawl 156 form a secondary or second clutch 179 that is normally biased to a locked state where the first clutch inhibits rotation of the spool 102 in one direction but allows rotation of the spool 102 in the opposite direction.

Due to the advancement of primary button 110 towards primary pawl 104, in the view shown in FIG. 6, primary pawl 104 has pivoted way from and disengaged from teeth 152 of primary spool 102. Thus, first 102 and second 154 spool may rotate in concert in a first direction (arrow 160) as a web (e.g., web 26) is pulled in the direction of arrow 162 during, for example, an "install" mode of web across the body of a child safety seat. In the present example, due to the configuration of teeth 155 and secondary pawl 158, a ratcheting effect occurs. As discussed above, spring 106 biases primary spool 102 in a second direction (opposite arrow 160 (FIG. 6)) with a rotational biasing force. Therefore, in order to rotate primary spool 102 in the first direction (arrow 160), a rotational force sufficient to overcome biasing force of spring 106 must be applied as, for example, web is pulled in the direction of arrow 162. Moreover, due to the bias of spring 106, during extraction/extension of web 26, accidental releasing of web by a user could result in the unintended retraction of web 26. However, due to the ratcheting interaction of teeth 155 and secondary pawl 158, secondary spool 154 (and thus primary spool 102) are substantially unable to rotate back in the second direction. By "substantially," it will be understood that secondary spool 154 may be allowed to rotate back in the second direction a slight amount until secondary pawl 158 engages the next tooth 155.

Once the user desires to retract the web, the user may push secondary button 160, which causes the pivotable member 156 to pivot such that the secondary pawl 158 disengages from one of teeth 155. Due to the relative positions of peg 174 and peg 164 and the interaction between compression spring 166 and pegs 174, 176, compression spring 166 maintains pivotable member 156 in the position shown in FIG. 6, disengaged from secondary spool 154. Thus, the rotational bias of spring 106 is able to cause the rotation of primary spool 102 and thus secondary spool 154 in the second direction (opposite arrow 160). Because of the configuration of teeth 152 relative to primary pawl 104, teeth and engagement members interact in a ratcheting manner. The rotational bias of spring 106 will continue to cause the rotation of primary and secondary spool members provided that there is not too little "slack" in the web providing a counterforce that is greater than the rotational biasing force of spring 106.

Figure 8A:
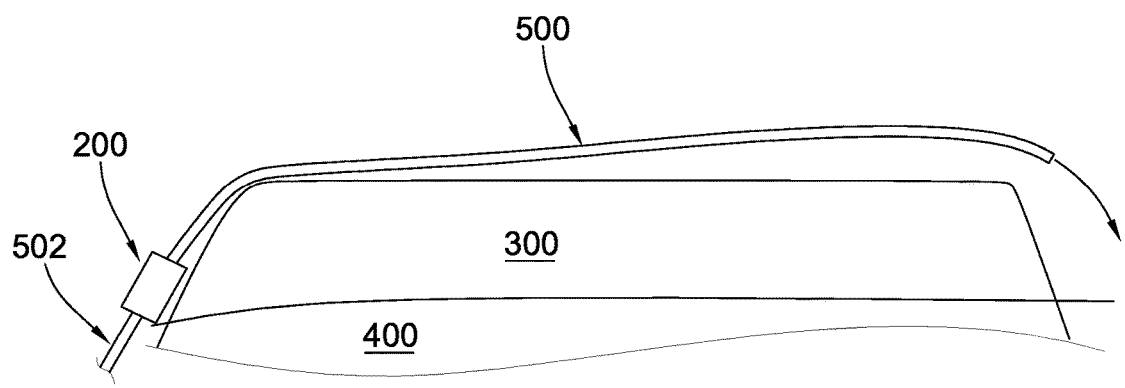
FIG. 8A is a schematic view of a connector incorporating the retractor of FIG. 4 being used to secure a portion of a child seat to a passenger seat.
Figure 8B:
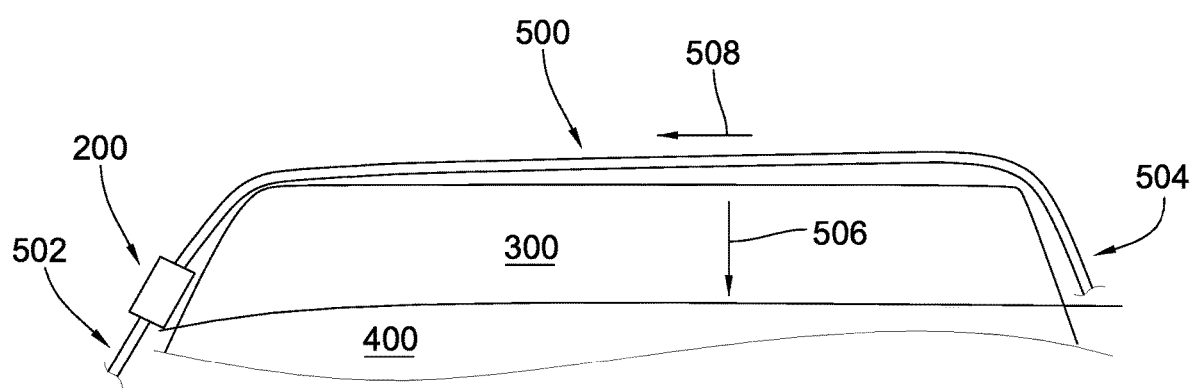
FIG. 8B is a schematic view of a connector incorporating the retractor of FIG. 3 being used to further secure a portion of a child seat to a passenger seat.

For example, as shown schematically in FIGS. 8A and 8B, a connector 200 incorporating the elements and characteristics of retractor 100 is shown being used to secure a portion of a child seat 300 to a passenger seat 400. A web 500 is operably coupled to connector 200 in a manner that will be understood by persons skilled in the art in view of the teachings herein. As shown, on a first side 502 web 500 is secured to, for example, the passenger seat via a conventional connection such as a conventional anchor bight. As shown in FIG. 8A, web 500 is being extended relative to the connector 200 and retractor 100 according to the teachings regarding retractor 100 herein. As shown in FIG. 8B, a second end 504 of web 500 has been secured to, for example, the passenger seat 400 via a conventional connection such as a conventional anchor bight. If desired, a user may further secure the portion of child seat 300 by pushing the child seat in the direction of arrow 506 to create "slack" in the web 500, which will cause the web 500 to retract in the direction of arrow 508, resulting in more tension on seat 300 when the force in direction of arrow 506 is released.

Figure 9:
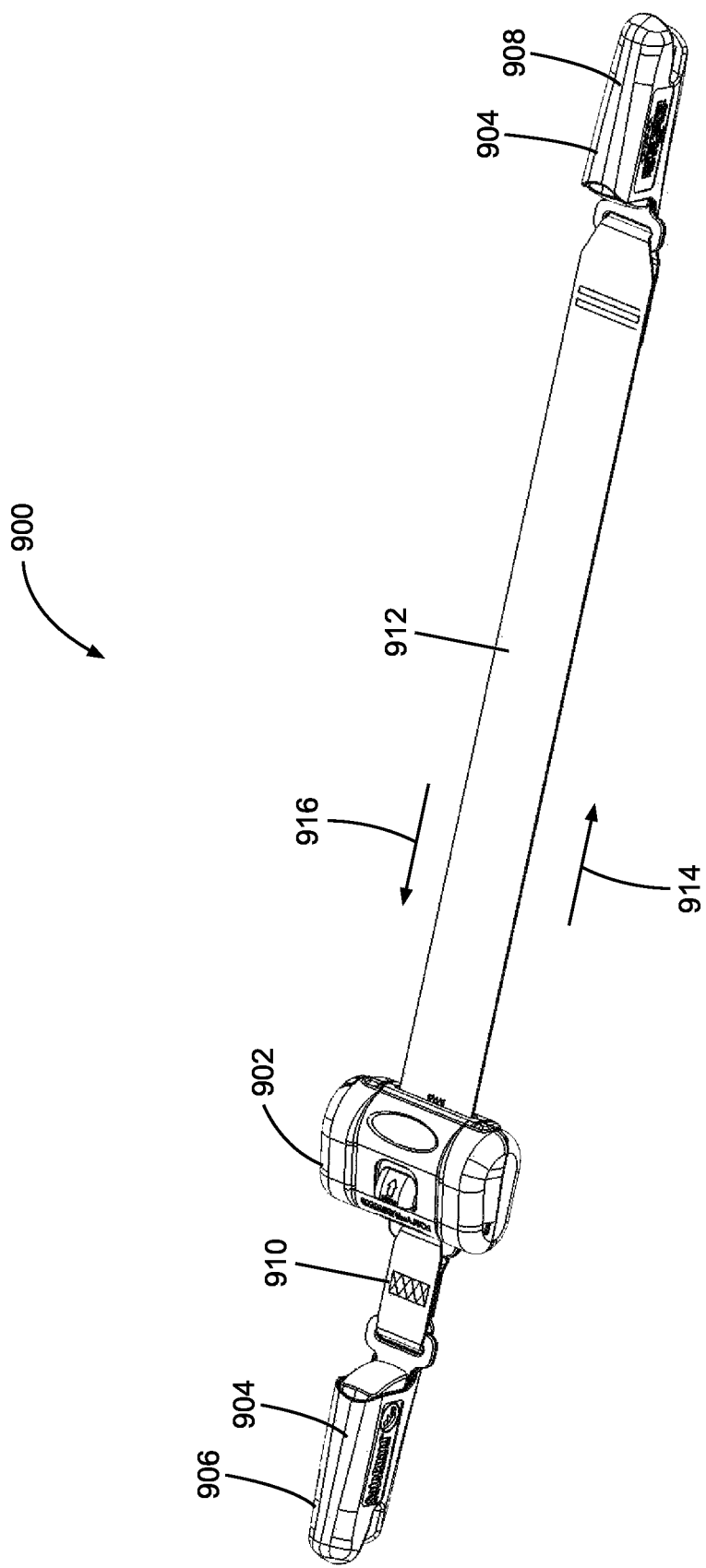
FIG. 9 is a perspective view of a mini-latch retractor system according to another example.

A perspective view of a mini-latch retractor system 900 according to another embodiment, which can be used to secure the child seat 21 is a fashion similar to that described and illustrated before in FIGS. 1-3 and 8, is illustrated in FIG. 9. As should be appreciated, the retractor system 900 in FIG. 9 shares a number of components in common with and operates in a fashion similar to the retractor 100 described above. For the sake of brevity and clarity, these common aspects will not be again described in great detail again, but please refer to the previous description. As shown, the system 900 includes a retractor 902 coupled to one or more connectors 904. In the illustrated example, the connectors 904 include a first, stationary connector 906 and a second, extendable connector 908 located at opposite ends, but it should be recognized that more (or less) connectors 904 can be used and/or the connectors 904 can be connected in different configurations than is shown. A fixed or stationary web 910 connects the retractor 902 to the stationary connector 906. While the length of the stationary web 910 can slightly change, such as when tension is applied, the stationary web 910 typically has the same static length relative to the retractor 902 and stationary connector 906. The stationary web 910 provides a flexible connection between the stationary connector 906 and the retractor 902. This flexibility of the stationary web 910 allows the stationary connector 906 to be easily secured to the anchor bight 24, even in tight situations. By having the retractor 902 separate from the stationary connector 906, the retractor 902 can be positioned at a location that facilitates easy interaction with and operation of the retractor 902. An extendable web 912 connects the retractor 902 to the extendable connector 908. Through the extendable web 912, the extendable connector 908 is able to extend by moving in an extension direction 914 relative to the retractor 902. In addition, the retractor 902 via the extendable web 912 allows the extendable connector 908 to retract in a retraction direction 916. As shown, the stationary web 906 is relatively shorter than the extendable web 912 so that the retractor is positioned to one side of the child seat 20 for easy access. While the retractor system 900 in the illustrated example has a single retractor 902 and a single extendable web 912, in other examples the retractor system 900 can include two more retractors 902 and/or extendable webs 912.

Figure 10:
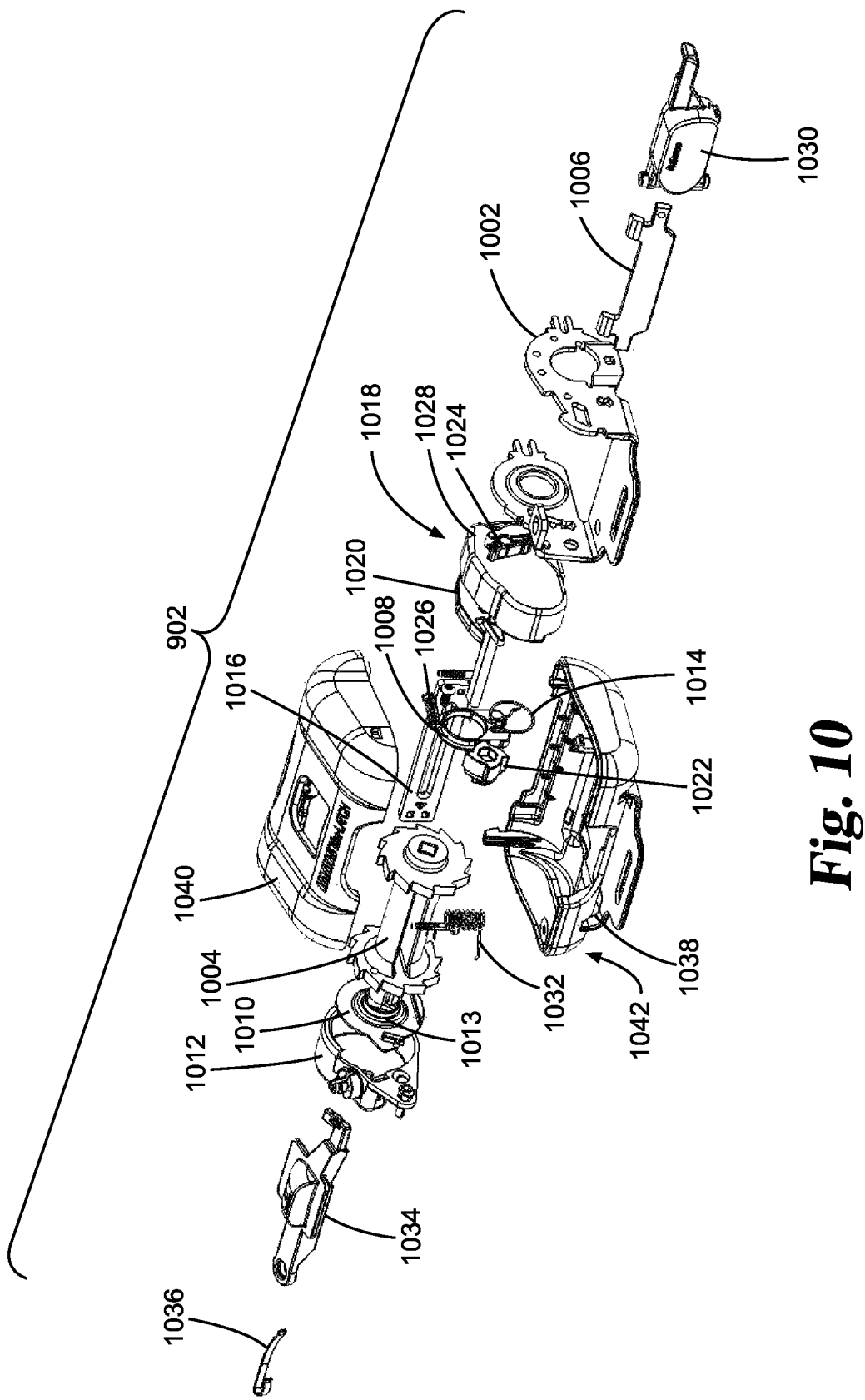
FIG. 10 is an exploded view of a retractor in the FIG. 9 system.
Figure 11:
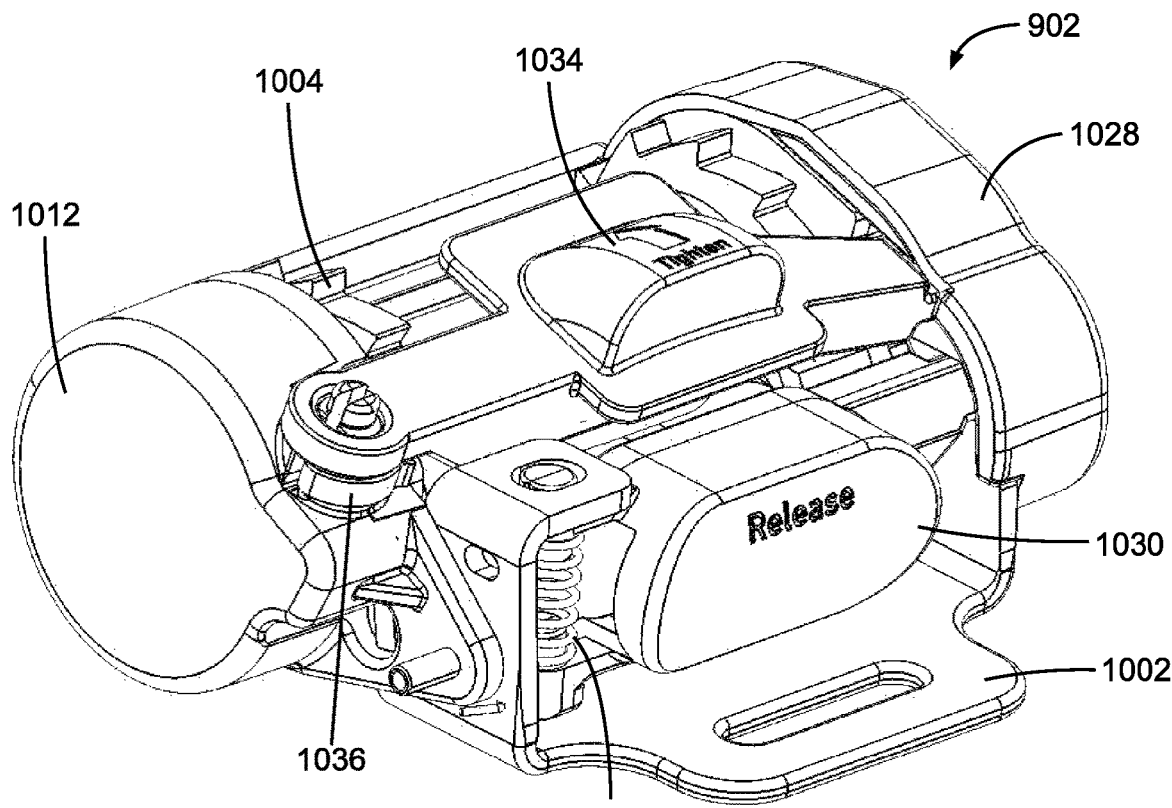
FIG. 11 is a rear perspective view of the FIG. 10 retractor.
Figure 12:
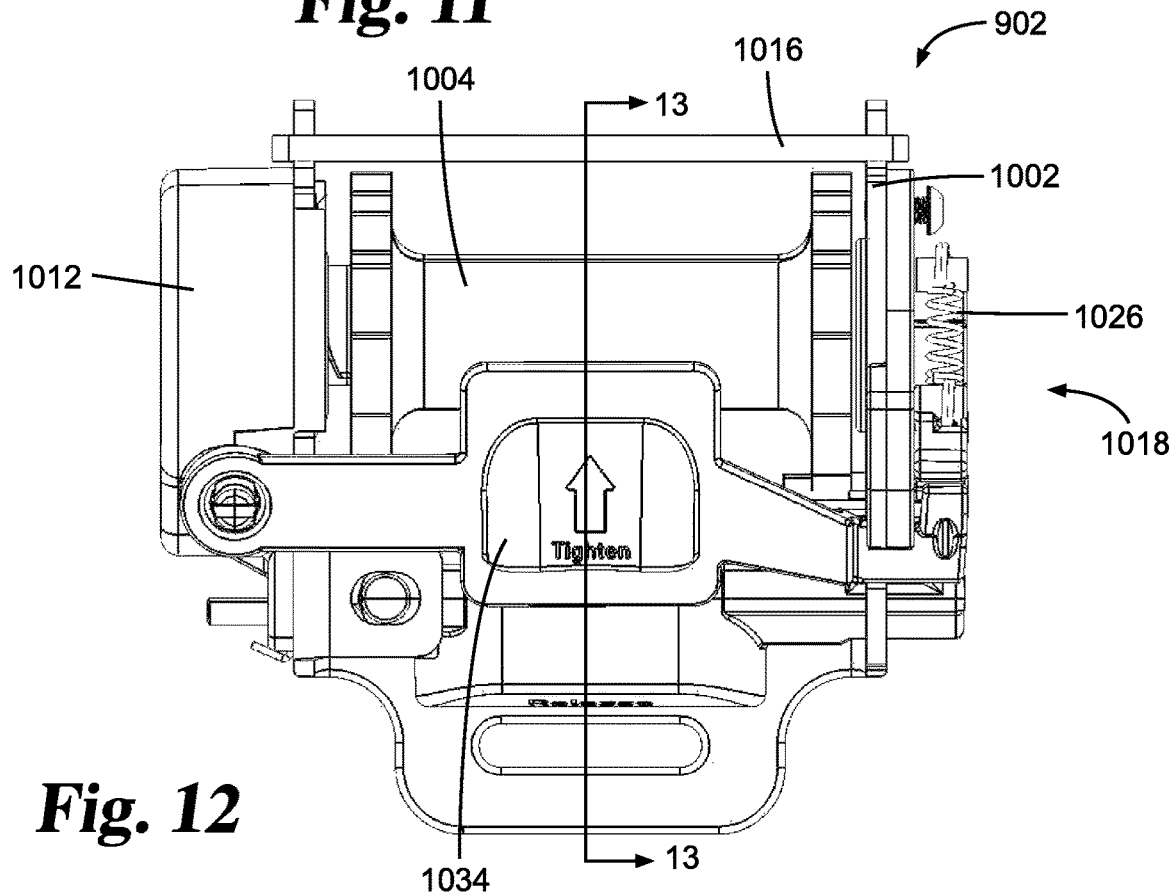
FIG. 12 is a top view of the FIG. 10 retractor.

FIG. 10 shows an exploded view of the retractor 902. FIGS. 11 and 12 respectively show perspective and top views of the retractor 902 with selected components removed. As can be seen, the retractor 902 includes a frame 1002 that rotatably supports a primary or first spool 1004. The extendable web 912 is wrapped around the spool 1004. A primary or first pawl 1006 is pivotally coupled to the frame 1002, and the pawl 1006 is configured to engage the spool 1004 in a ratcheting type manner. To facilitate rotation of the spool 1004 relative to the frame 1002, the retractor 902 has snap-in 1008 and spring cup 1010 bushings coupled to the frame 1002 at opposite ends of the spool 1004. A spring cup 1012 houses the spring cup bushing 1010 along with a main or spool spring 1013 that biases the spool 1004 in a fashion similar to the previous example described with reference to FIGS. 4-7. The spool spring 1013 is operatively connected between the spring cup bushing 1010 and the spool 1004. The spool spring 1013 stores potential energy as the extendable web 912 is moved in the extension direction 914. A pawl bias spring 1014 is coupled between the pawl 1006 and the frame 1002 so as to bias the pawl 1006 into engagement with the spool 1004. When engaged, the pawl 1006 only allows the spool 1004 to rotate in one direction. Specifically, the pawl 1006, when engaged with the spool 1004, only allows the extendable web 912 to move in the retraction direction 916, and the pawl 1006 prevents the extendable web 912 from moving in the extension direction 914. This ensures that the mini-retractor system 900 remains tight such as during a crash. On the other hand, when the pawl 1006 is disengaged from the spool 1004, the user is able to pull on the extendable web 912 so that the extendable web 912 is able to extend so that the connectors 904 can be properly secured. As the extendable web 912 is extended in the extension direction 914, the spool spring 1013 stores the potential energy that can be later used to retract the extendable web 912 in the retraction direction 916. The extendable web 912 extends through a tie bar 1016 that is secured to the frame 1002. The tie bar 1016 acts as a guide as well as provides a hard stop for stitching on the extendable web 912 so as to prevent over or under extension of the extendable web 912. In one example, the tie bar 1016 is secured in a riveted type matter to the frame 1002, but the tie bar 1016 can be secured in other ways.

As shown, the retractor 902 further includes a locking or toggle ratcheting mechanism or 1018 that is configured to hold the extendable web 912 in an extended state counter to the biasing force of the spool spring 1013. The toggle mechanism 1018 is able to toggle between a locked state that prevents retraction of the extendable web 912 (i.e., counter to the force of the spool spring 1013) and a release state that allows the extendable web 912 to automatically retract in the retraction direction 916 (due to the spool spring 1013) so as to tighten the mini-latch retractor system 900. In the illustrated example, the toggle ratcheting mechanism 1018 includes a body 1020 that is secured to the frame 1002, a secondary or toggle pawl 1024 that is pivotally connected to the body 1020, a secondary or ratchet spool 1022 that is connected to one end of the spool 1004, and a toggle spring 1026 that is connected between the body 1020 and the toggle pawl 1024. In one form, the toggle spring 1026 includes a compression spring, but the toggle spring 1026 can include other types of biasing structures or mechanisms. The toggle spring 1026 biases the toggle pawl 1024 between two stable or bistable states. In one state, the toggle pawl 1024 is engaged or locked with the ratchet spool 1022 so as to prevent retraction of the extendable web 912, and in another state, the toggle pawl 1024 is disengaged or unlocked from the ratchet spool 1022, thereby allowing the extendable web 912 to retract. A toggle cover 1028 covers and protects the components of the toggle ratcheting mechanism 1018 and provides a support point for the components.

A primary or release button 1030 is pivotally coupled to the frame 1002. When pressed, the release button 1030 simultaneously or sequentially pivots the pawl 1006 so that the pawl 1006 is disengaged from the spool 1004 and pivots the toggle pawl 1024 to the engaged state where the toggle pawl 1024 engages the ratchet spool 1022 in a ratcheting manner. A release button bias spring 1032 biases the release button 1030 away from engagement with the pawl 1006 and the toggle pawl 1024. In the illustrated example, the release button bias spring 1032 is a torsion spring, but other types of biasing structures or mechanisms can be used in other examples. A secondary or tighten button 1034 is pivotally connected to the spring cup 1012. When pressed or pushed towards the extendable web 912, the tighten button 1034 pushes or toggles the toggle pawl 1024 to the disengaged position where the toggle pawl 1024 is disengaged from the ratchet spool 1022 so as to allow retraction of the extendable web 912. A tighten button bias spring 1036 is connected between the spring cup 1012 and the tighten button 1034 so as to bias the tighten button 1034 away from the toggle pawl 1024. As depicted, a base cover 1038 and a button cover 1040 are clamped together in a clamshell type configuration to form a housing 1042 that generally encloses the components of the retractor 902. In one form, at least the frame 1002, spool 1004, pawl 1006, and tie bar 1016 as well as various springs are made of metal (e.g., steel) so as to provide added strength, and the other components are made of plastic. It should be nevertheless recognized that different types of materials and/or different combinations of materials can be used.

Figure 13:
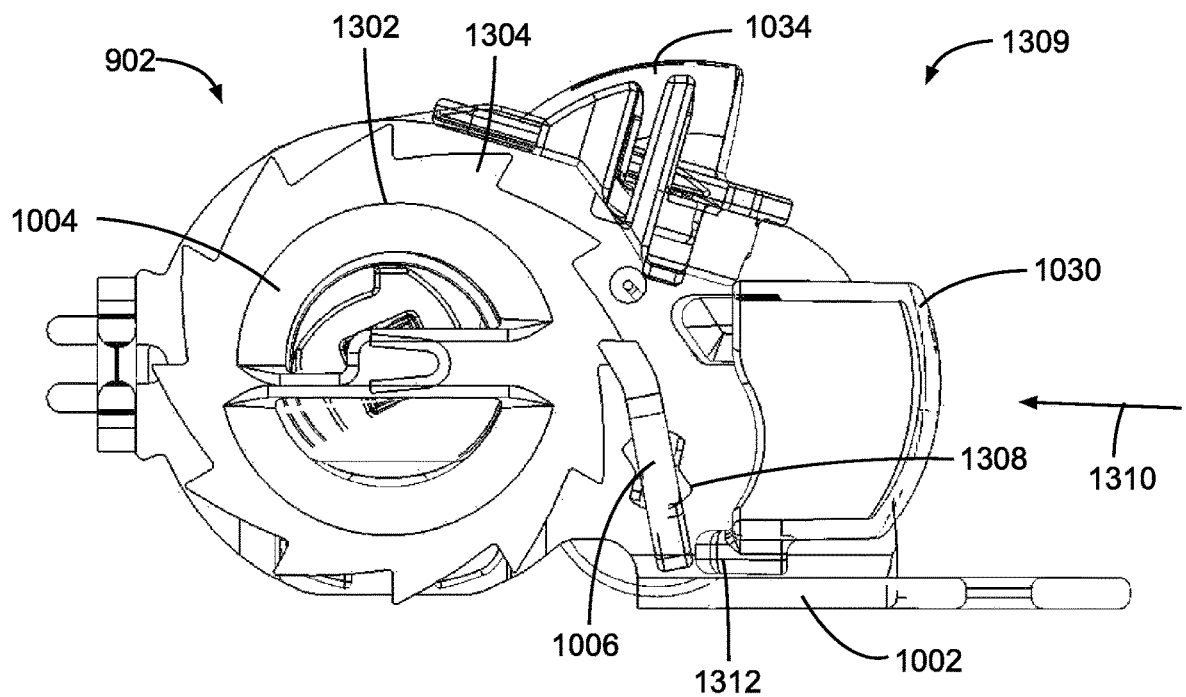
FIG. 13 is a cross-sectional view of the FIG. 10 retractor as taken along line 13-13 in FIG. 12.
Figure 14:
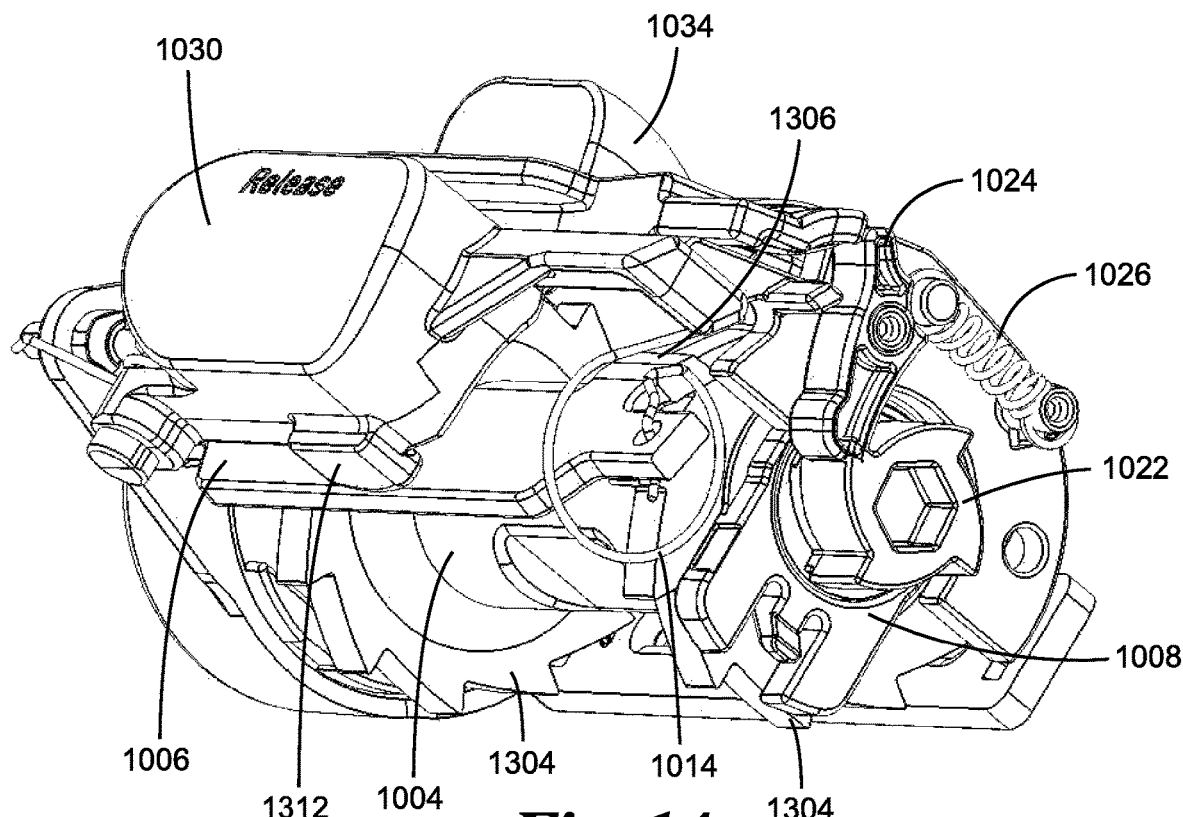
FIG. 14 is a rear perspective view of the FIG. 10 retractor with selected components removed.

FIG. 13 shows a cross-sectional view of the retractor 902 as taken along line 13-13 in FIG. 12, and FIG. 14 shows a rear perspective view of the retractor 902 with the frame 1002 and other selected components removed to improve visibility of the engagement between the spool 1004 and the pawl 1006. As can be seen, the spool 1004 includes a shaft 1302 around which the extendable web 912 is wrapped. At both ends of the shaft 1302, the spool 1004 has one or more ratchet teeth 1304 configured to engage with the pawl 1006. In the illustrated example, the teeth 1304 of the spool 1004 are a series of circumferentially spaced ratchet teeth that are angled to engage the pawl 1006 and in a ratcheting manner. The pawl 1006 includes teeth engagement members 1306 that are positioned to engage the ratchet teeth 1304 in a ratcheting manner. The pawl 1006 is pivotally connected to the frame 1002 via a pawl opening 1308 in the frame 1002. As noted before, the pawl bias spring 1014 biases the teeth engagement members 1306 of the pawl 1006 to engage the ratchet teeth 1304 of the spool 1004. Together the pawl 1006 and the ratchet teeth 1304 of the spool 1004 form a primary or first clutch 1309. The first clutch 1309 has an engaged state where the first clutch 1309 inhibits rotation of the spool 1004 in the extension direction 914 and a disengaged state where the first clutch 1309 allows rotation of the spool 1004 in the extension direction 914. Looking at FIGS. 13 and 14, when the release button 1030 is pressed towards the pawl 1006, as is indicated by direction arrow 1310, a pawl engagement member 1312 presses against the pawl 1006. Further pressing of the release button 1030 causes the pawl 1006 to rotate in a clockwise direction (from the perspective in FIG. 13) so as to disengage the teeth engagement members 1306 from the ratchet teeth 1304. Once the ratchet teeth 1304 of the spool 1004 are disengaged from the pawl 1006, the user is able to pull the extendable web 912 in the extension direction 914 so as to provide added slack for the mini-latch retractor system 900. Given that the pawl 1006 is biased by the pawl bias spring 1014 to engage the ratchet teeth 1304 on the spool 1004, once the release button 1030 is no longer pressed, the pawl 1006 engages the spool 1004 so as to prevent any further extension of the extendable web 912.

Figure 15:
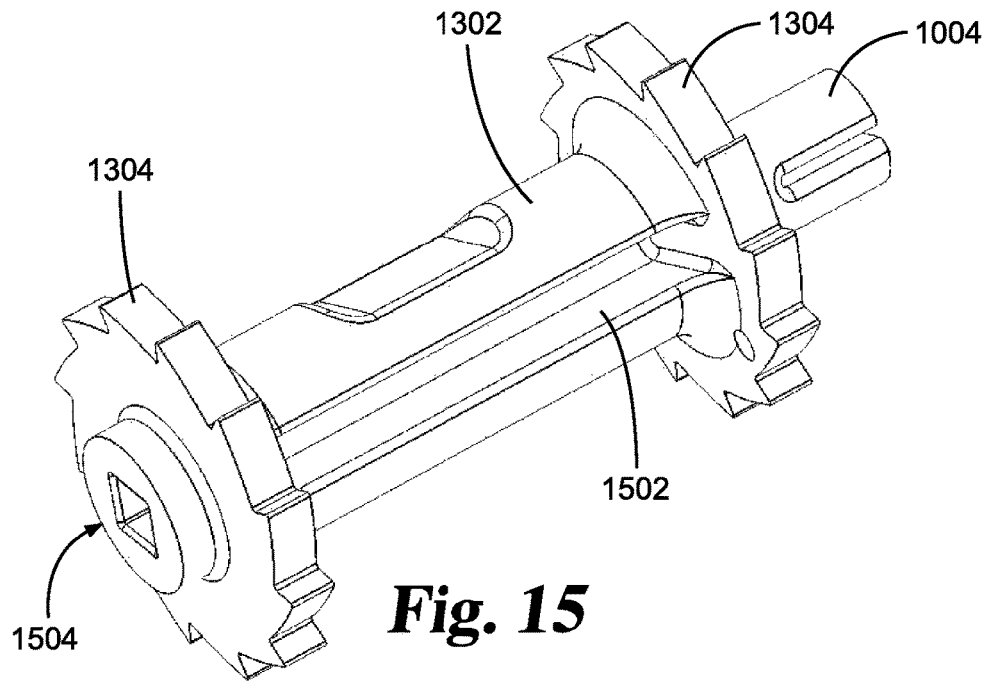
FIG. 15 is a perspective view of a spool found in the FIG. 10 retractor.

FIG. 15 shows a perspective view of the spool 1004. As can be seen, the ratchet teeth 1304 are disposed on opposing ends of the shaft 1302. The shaft 1302 defines a web slot 1502 in which one end of the extendable web 912 is secured. At one end of the shaft 1302, the spool 1004 defines a ratchet spool cavity 1504 to which the ratchet spool 1022 is secured.

Figure 16:
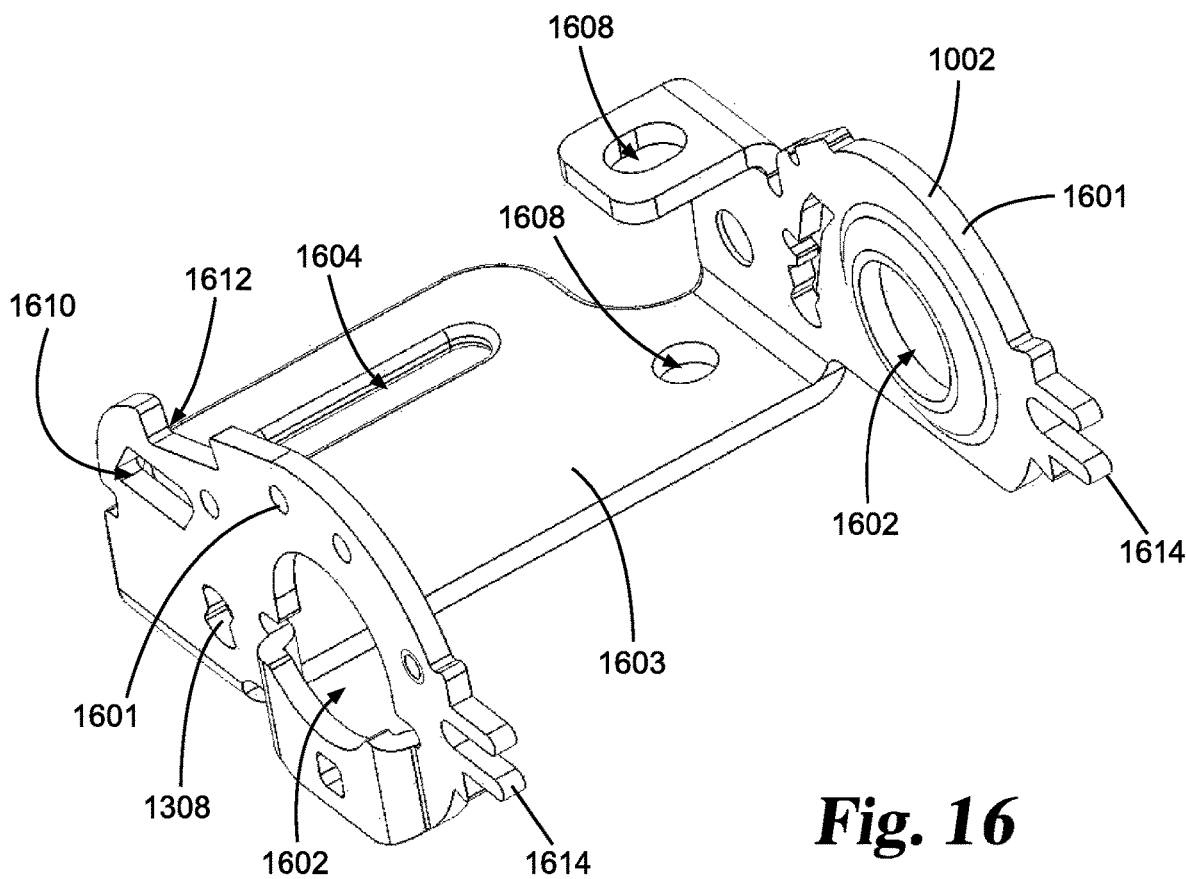
FIG. 16 is a perspective view of a frame found in the FIG. 10 retractor.

Turning to FIG. 16, the frame 1002 has opposing side flanges 1601 each defining spool openings 1602 in which the ends of the spool 1004 are rotatably received. The frame 1002 further has a base or bottom flange 1603 that defines a web slot 1604 through which the stationary web 910 is looped and secured. To pivotally secure the release button 1030 to the frame 1002, the frame 1002 has a release button pivot flange 1606. The release button pivot flange 1606 along with the base flange 1603 of the frame 1002 define release button pivot openings 1608 to which the release button 1030 is pivotally secure. Opposite the release button pivot flange 1606, the frame 1002 defines a release button extension opening 1610 through which a portion of the release button 1030 extends in order to actuate the toggle pawl 1024. The frame 1002 further defines a tighten button relief notch 1612 through which a portion of the tighten button 1034 extends in order to actuate the toggle pawl 1024. The frame 1002 further includes one or more rivet members 1614 that are deformed in order to secure the tie bar 1016 to the frame 1002.

Figure 17:
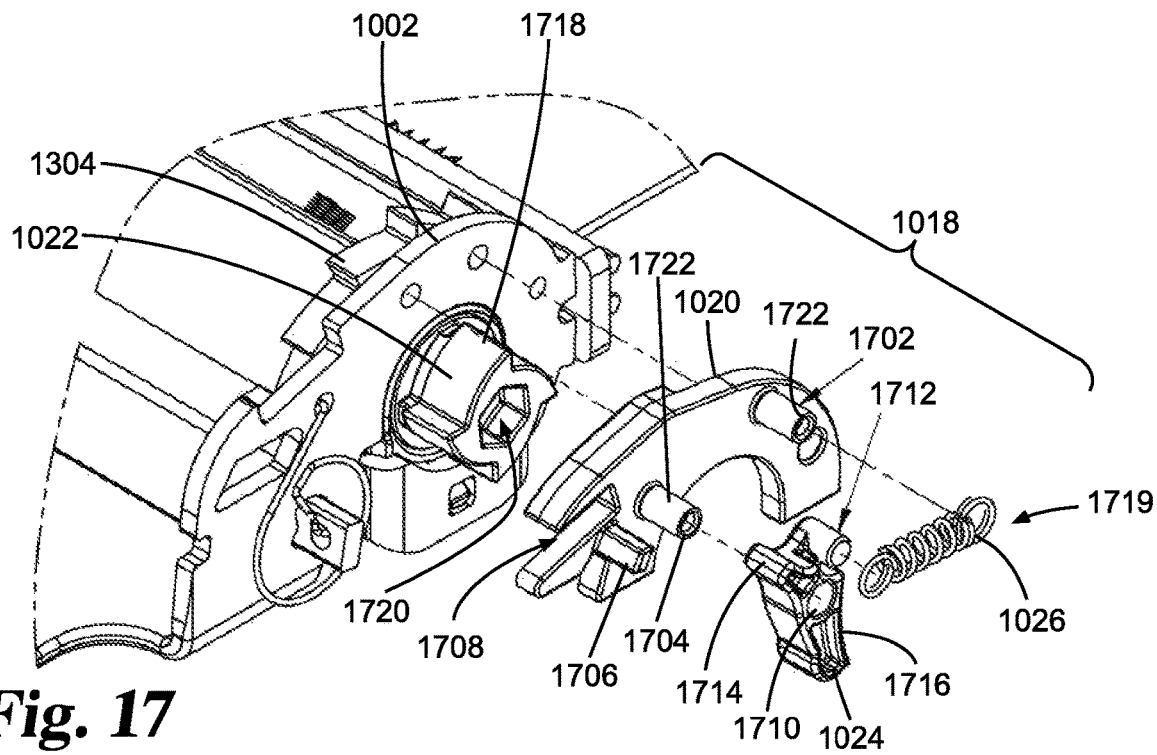
FIG. 17 is an exploded view of a toggle ratcheting mechanism found in the FIG. 10 retractor.
Figure 18:
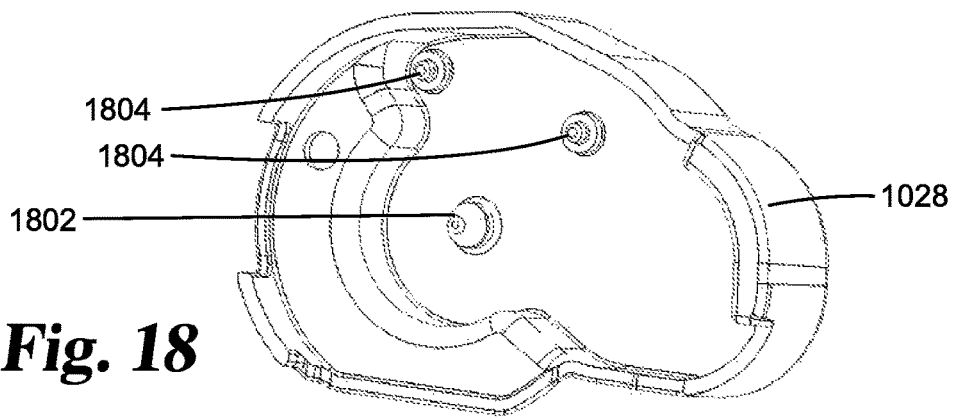
FIG. 18 is a perspective view of a toggle cover found in the FIG. 10 retractor.

An exploded view of the toggle ratcheting mechanism 1018 is depicted in FIG. 17. As illustrated, the body 1020 of the toggle ratcheting mechanism 1018 is secured to the frame 1002. The body 1020 is arched around the ratchet spool 1022. The body 1020 has a spring engagement pin 1702 to which the toggle spring 1026 is secured. The body 1020 further includes a pivot pin 1704 upon which the toggle pawl 1024 is pivotally secured. A stop member 1706 extends from the body 1020 so as to provide a hard stop for toggle pawl 1024 when pivoted to a released position or unlocked state. The body 1020 further defines a guide notch 1708 through which a portion of the tighten button 1034 extends in order to engage with the toggle pawl 1024. The toggle pawl 1024 defines a pivot opening 1710 in which the pivot pin 1704 of the body 1020 is received. It should be recognized that the toggle pawl 1024 rotates about the pivot pin 1704. The toggle pawl 1024 further includes a spring coupling pin 1712 to which the toggle spring 1026 is secured. As can be seen, the spring coupling pin 1712 is positioned offset from the pivot opening 1710 which in turn facilitates the bistable positioning of the toggle pawl 1024. The toggle pawl 1024 further includes a tighten button engagement arm 1714 and a teeth engagement arm 1716. The tighten button engagement arm 1714 is positioned to provide leverage for rotating the toggle pawl 1024 by the tighten button 1034. The teeth engagement arm 1716 is configured to engage with one or more ratchet teeth 1718 on the ratchet spool 1022 in a ratcheting manner. As can be seen, the ratchet teeth 1718 on the ratchet spool 1022 are oriented in an opposite fashion to the ratchet teeth 1304 of the spool 1004. The toggle pawl 1024 and the ratchet teeth 1718 of the ratchet spool 1022 in toggle ratcheting mechanism 1018 form a secondary or second clutch 1719. The second clutch 1719 has a locked state where the second clutch 1719 inhibits rotation of the spool in the retraction direction 916 and an unlocked state where the second clutch 1719 allows rotation of the spool 1004 in the retraction direction 916. The ratchet spool 1022 further includes a support opening 1720 supporting the ratchet spool 1022 during rotation. The pins 1702, 1704 similarly have support dimples 1722 at their ends. Looking at FIG. 18, the inside of the toggle cover 1028 has a ratchet spool support pin 1802 that is received in the support opening 1720 of the ratchet spool 1022 in order to provide additional support for the ratchet spool 1022. The inside of the toggle cover 1028 further has support protrusions 1804 that are positioned to be received in the support dimples 1722 of the pins 1702, 1704 to align and provide additional support for the pins 1702, 1704. In one form, the toggle cover 1028 is secured to the frame 1002 via a screw, but the toggle cover 1028 in other examples can be secured in other manners, such as through adhesives, welding, etc.

Figure 19:
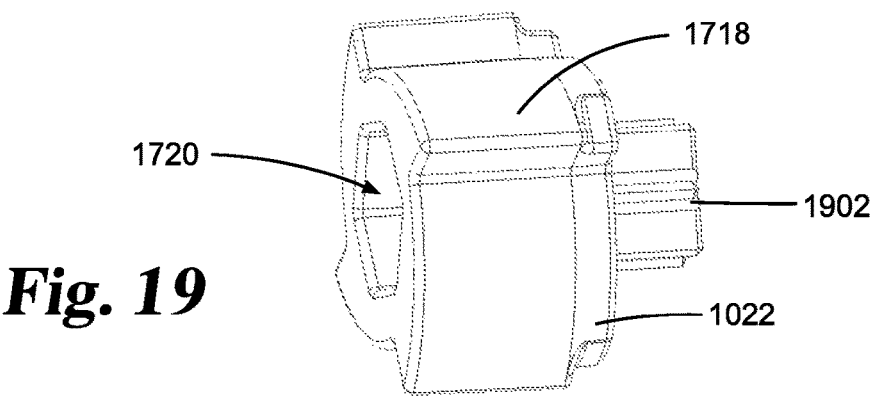
FIG. 19 is a perspective view of a ratchet spool found in the FIG. 10 retractor.

Turning to FIG. 19, the ratchet spool 1022 has a spool engagement member 1902 that is configured to lock into the ratchet spool cavity 1504 (FIG. 15) in the spool 1004. In the illustrated example, both the ratchet spool cavity 1504 and the spool engagement member 1902 have a square or rectangular shape so as to prevent relative movement between the spool 1004 and the ratchet spool 1022, but these components in other examples can be shaped differently than is illustrated.

Figure 20:
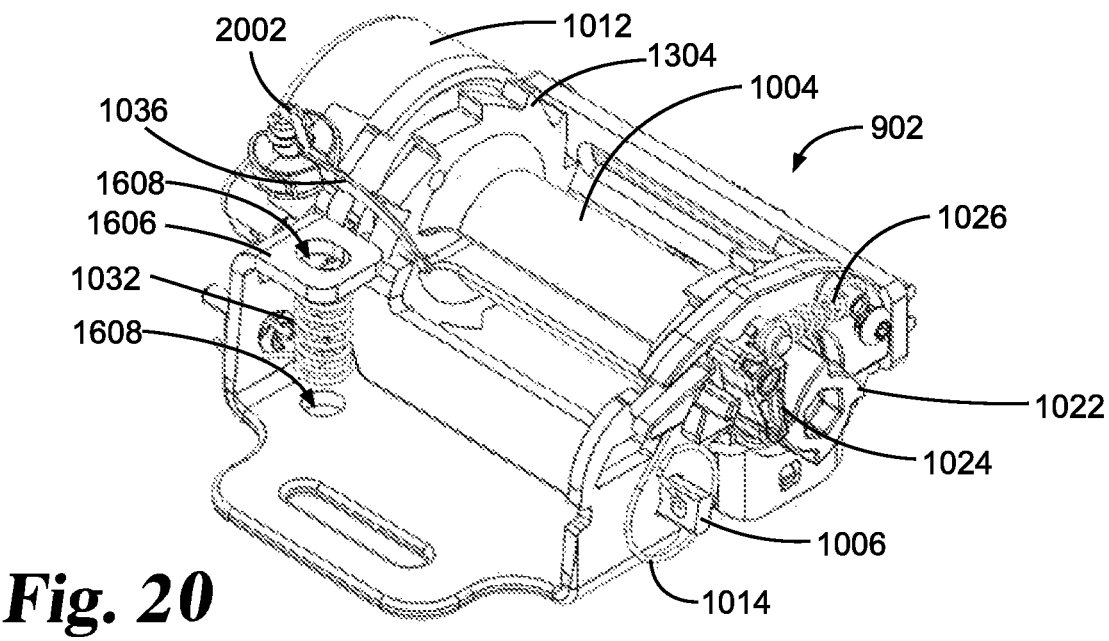
FIG. 20 is a perspective view of the FIG. 10 retractor with buttons and other components removed.

FIG. 20 shows a perspective view of the retractor 902 with selective components, such as the release button 1030 and the tighten button 1034, removed so that the various biasing springs, such as the pawl bias spring 1014, the toggle spring 1026, the release button biasing spring 1032, and the tighten button biasing spring 1036, can be viewed. As noted before, the pawl bias spring 1014 biases the pawl 1006 to normally engage or lock with the ratchet teeth 1304 of the spool 1004 in a ratcheting manner. The toggle spring 1026 is used to bias the toggle pawl 1024 into the bi-stable positions where the toggle pawl 1024 is either engaged or disengaged from the ratchet spool 1022. In the illustrated example, the toggle spring 1026 is in the form of a coil compression spring, but other types of springs can be used in other examples. The release button bias spring 1032 is positioned proximal to the release button pivot flange 1606 so as to engage and bias the release button 1030 away from contacting or engaging the pawl 1006 and the toggle pawl 1024. In the depicted example, the release button bias spring 1032 is in the form of a coil spring, but other types of springs can be used in other variations. As can be seen, the spring cup 1012 has a snap pin 2002 around which the tighten button bias spring 1036 is secured. The tighten button bias spring 1036 is configured to bias the tighten button 1034 away from engaging or contacting the toggle pawl 1024. In the illustrated example, the tighten button bias spring 1036 is generally in the form of a leaf spring, but other types of springs can be used in different examples.

Figure 21:
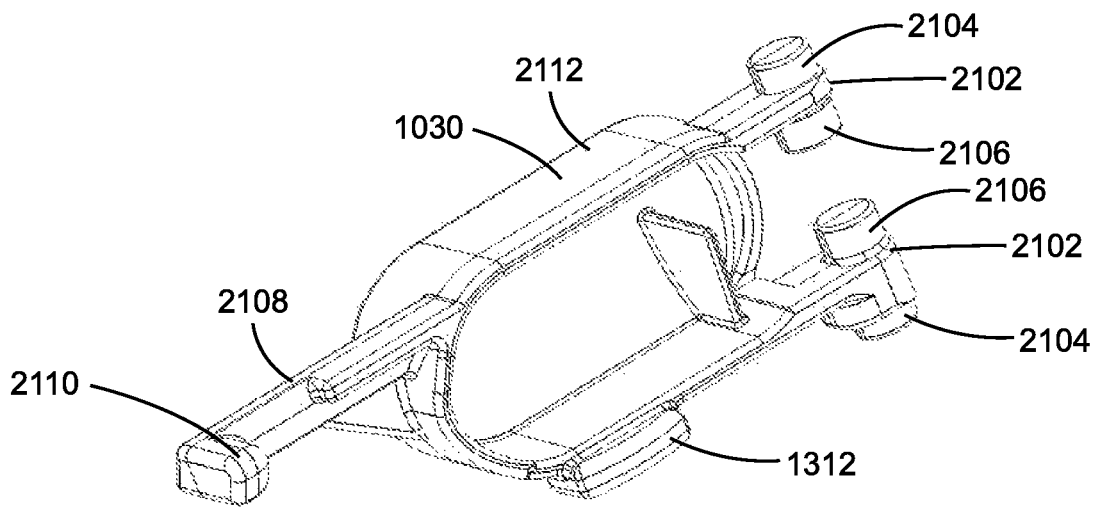
FIG. 21 is a rear perspective view of a release button found in the FIG. 10 retractor.

FIG. 21 shows a rear perspective view of the release button 1030. As can be seen the release button 1030 includes one or more hinge arms 2102 about which the release button 1030 pivots. Looking at FIGS. 20 and 21, the hinge arms have hinge pins or pegs 2104 that are pivotally received in the release button pivot openings 1608. The hinge arms 2102 further include spring pins 2106 that face one another. The release button bias spring 1032 is secured to the spring pins 2106 to facilitate biasing of the release button 1030. As noted before, the release button 1030 has the pawl engagement member 1312 that is positioned to press against the pawl 1006 so as to disengage the pawl 1006 from the ratchet teeth 1304 when the release button 1030 is pressed. Opposite the hinge arms 2102, the release button 1030 has a toggle actuation arm 2108 with a lock toggle or extension member 2110 positioned so as to be able to press against or actuate the toggle pawl 1024. In particular, the lock toggle member 2110 is configured to press against the tighten button engagement arm 1714 (FIG. 17) of the toggle pawl 1024. The toggle actuation arm 2108 extends from a body 2112 of the release button 1030. The body 2112 of the release button 1030 is where the user presses the release button 1030.

Figure 22:
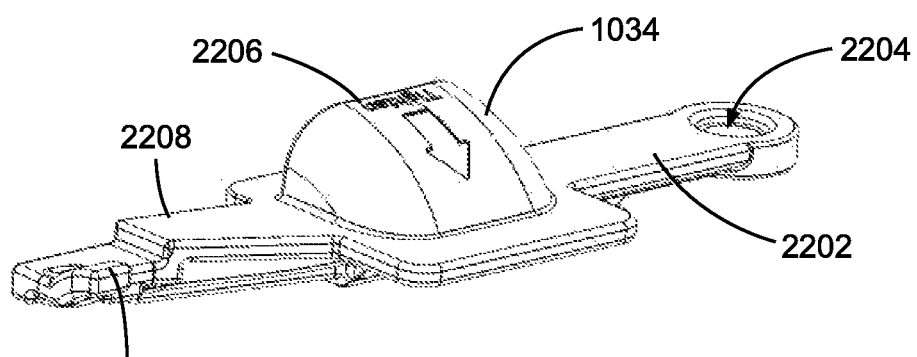
FIG. 22 is a front perspective view of a tighten button found in the FIG. 10 retractor.

FIG. 22 shows a front perspective view of the tighten button 1034. The tighten button 1034 includes a pivot arm 2202 that defines a snap pin opening 2204 in which the snap pin 2002 of the spring cup 1012 is snapped fitted so as to create a pivot type connection. The tighten button 1034 further includes an actuation body 2206 where the user presses so as to actuate the tighten button 1034. Extending from the actuation body 2206, the tighten button 1034 has a toggle actuation arm 2208 with a unlock toggle member 2210 that is configured to contact or actuate the toggle pawl 1024. Specifically, the unlock toggle member 2210 of the tighten button 1034 is positioned to contact the teeth engagement arm 1716 (FIG. 17) when the tighten button 1034 is pressed or otherwise actuated.

Figure 23:
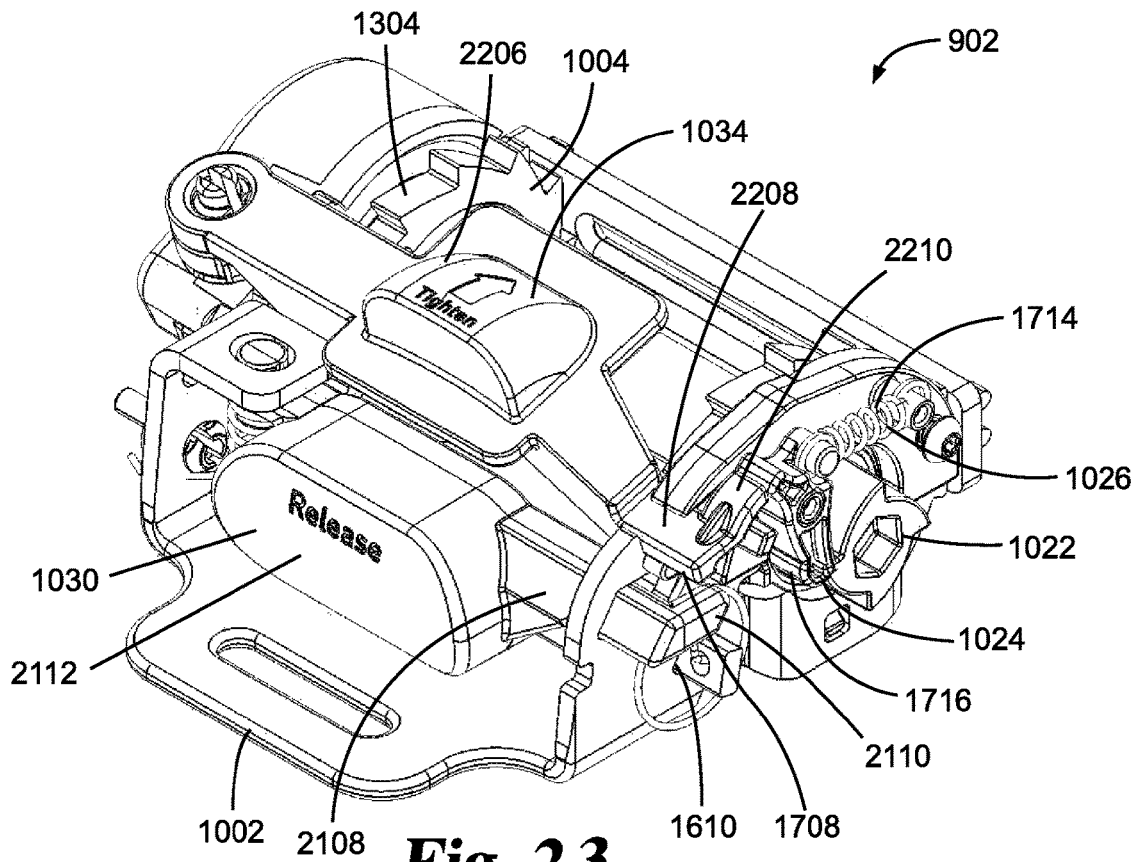
FIG. 23 is a perspective view of the FIG. 10 retractor with the toggle cover removed.
Figure 24:
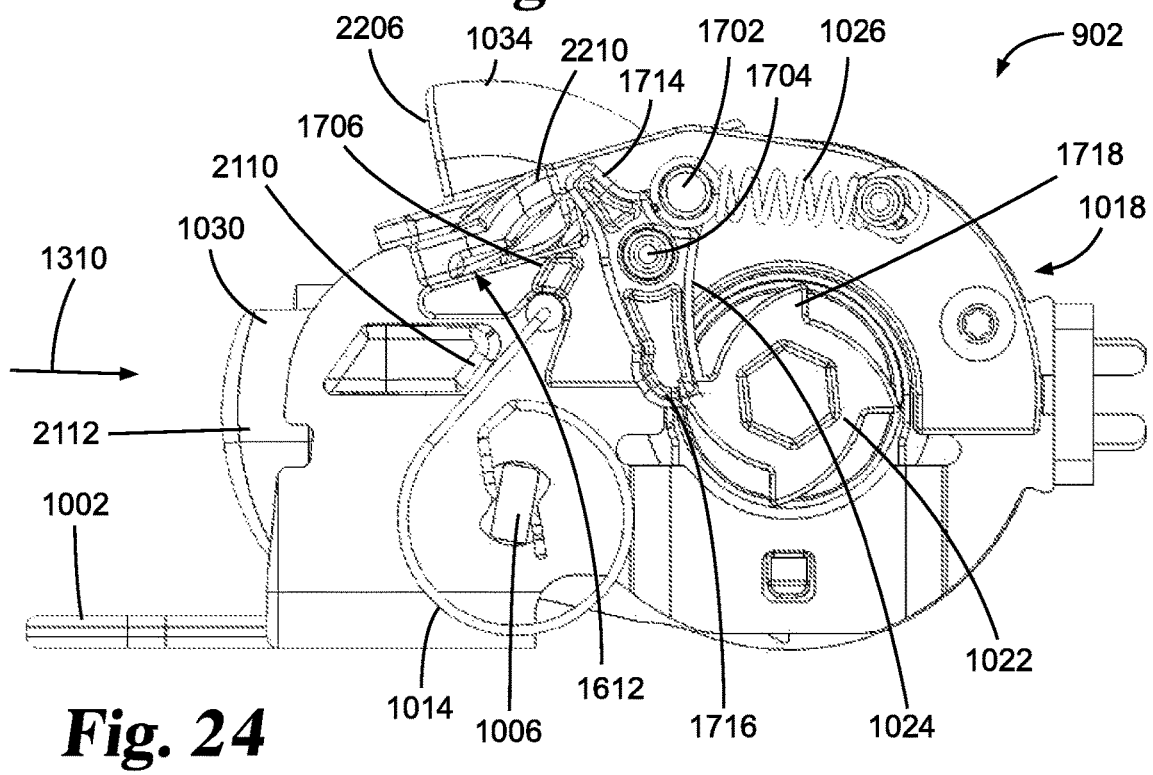
FIG. 24 is a side view of the FIG. 10 retractor with the toggle cover removed.

FIG. 23 provides a rear perspective view of the retractor 902 with selected components removed to provide greater visibility about the internal workings of the retractor 902, and FIG. 24 shows a side view of the retractor 902 facing the toggle ratcheting mechanism 1018. As can be seen, the toggle actuation arm 2108 of the release button 1030 extends through the release button extension opening 1610 in the frame 1002. The release button extension opening 1610 provides a guide for the toggle actuation arm 2108 so that the lock toggle member 2110 is positioned properly to actuate the toggle pawl 1024. The toggle actuation arm 2208 of the release button 1034 is positioned in the tighten button relief notch 1612 in the frame 1002 as well as the guide notch 1708 in the body 1020 of the toggle ratcheting mechanism 1018. Such an arrangement helps to align and guide the unlock toggle member 2210 of the tighten button 1034 with the toggle pawl 1024 when the tighten button 1034 is actuated.

Again, the retractor 902 in FIG. 9 operates in a fashion similar to the retractor 100 described above with respect to FIGS. 4-8. As mentioned before, the pawl bias spring 1014 biases the pawl 1006 so as to engage the ratchet teeth 1304 of the spool such that the extendable web 912 (FIG. 9) is unable to extend from the retractor 902. In the depicted configuration, the toggle pawl 1024 engages the ratchet teeth 1718 of the ratchet spool 1022 so that the extendable web 912 is unable to retract or tighten. As alluded to previously, the retractor 902 includes a dual button design (i.e., buttons 1030 and 1034) that prevent accidental tightening or releasing of the extendable web 912. To extend the extendable web 912 so as to provide enough slack for connecting the connectors 904 to the anchor bights 24, the user presses on the release button 1030 in direction 1310 and pulls on the extendable web 912. Upon pressing the release button 1030, the pawl engagement member 1312 of the release button 1030 pivots the pawl 1006 such that the pawl 1006 disengages from the ratchet teeth 1304 of the spool 1004. As the extendable web 912 is pulled, the spool spring 1013 is wound so as to store the energy from the pulling action that is later used to retract the extendable web 912. At the same time, the toggle pawl 1024 engages the ratchet teeth 1718 of the ratchet spool 1022 in a ratcheting manner as the spool 1004 rotates. As mentioned before, the toggle spring 1026 biases the toggle pawl 1024 to an engaged position so that the toggle pawl 1024 remains engaged to the ratchet spool 1022 in a ratcheting manner. The toggle pawl 1024 prevents the extendable web 912 from snapping back from the force of the wound spool spring 1013 such that the extendable web 912 remains at the desired extended length the user has pulled. This is very helpful to the user because the user does not have to wrestle with the constant pulling or tension in the extendable web 912 when the connectors 904 are being connected to the anchor bights 24. The user can pull the extendable web 912 so that the extendable web 912 has desired slack for connecting the connectors 904. Upon releasing the release button 1030, the pawl bias spring 1014 causes the pawl 1006 to automatically engage the ratchet teeth 1304 of the spool 1004 such that the extendable web 912 is no longer able to extend from the retractor 902. In other words, the extendable web 912 is locked into position so that the extendable web 912 is unable to extend or retract. This provides added safety because the retractor 902 fails to a position where the extendable web 912 is always secured.

To tighten or remove slack from the extendable web 912, the user presses on the actuation body 2206 of the tighten button 1034 (in direction 1310). Upon pressing the tighten button 1034, the unlock toggle member 2210 of the tighten button 1034 presses against the tighten button engagement arm 1714 of the toggle pawl 1024. This in turn causes the toggle pawl 1024 pivot about the pivot pin 1704 such that the teeth engagement arm 1716 disengages or unlocks from the ratchet teeth 1718 of the ratchet spool 1022. The tighten button 1034 continues to rotate the toggle pawl 1024 until the teeth engagement arm 1716 presses against and is stopped by the stop member 1706. As the toggle pawl 1024 pivots, the toggle spring 1026 becomes compressed. When the spring engagement pin 1702 of the toggle pawl 1024 is rotated to a position past the pivot pin 1704, the toggle spring 1026 is able to be released and extend so as to hold the toggle pawl 1024 in a disengaged position where the teeth engagement arm 1716 rests against the stop member 1706. With the toggle pawl 1024 disengaged from the ratchet spool 1022, the spool 1004 is free to rotate so as to tighten the extendable web 912. As noted before, when the extendable web 912 was pulled, the spool spring 1013 was wound. Having the toggle pawl 1024 at a disengaged position allows the spool spring 1013 to be released and automatically tighten the extendable web 912 by rotating the spool 1004 in a clockwise direction (as viewed in FIG. 24). By one simple press of the tightening button 1034, the user is able to automatically tighten the extendable web 912. The pawl 1006 ensures that the extendable web 912 remains in the tightened state.

In order to re-extend the extendable web 912, the user again presses on the release button 1030. Upon pressing the release button 1030, the lock toggle member 2110 of the release button 1030 presses against the teeth engagement arm 1716 of the lock toggle pawl 1024. This in turn causes the toggle pawl 1024 to rotate back to the engaged or locked position where the teeth engagement arm 1716 engages or locks with the ratchet teeth 1718 of the ratchet spool 1022, as is depicted in FIGS. 23 and 24. With the toggle pawl 1024 engaged to the ratchet spool 1022, the extendable web 912 is unable to retract. It also should be also recognized that the release button 1030 can be temporarily pressed and released during retraction of the extendable web 912 so as to set the desired length or slack of the extendable web 912 extending from the retractor 902. When the release button 1030 is temporarily pressed during retraction, the toggle pawl 1024 is rotated to the engaged position with the ratchet spool 1022 such that the spool 1004 is no longer able to rotate and retract the extendable web 912. Upon releasing the release button 1030, the release button bias spring 1032 springs the release button 1030 back to its original position. At that point, the pawl 1006 prevents extension of the extendable web 912 and the toggle pawl 1024 in turn prevents retraction of the extendable web 912 such that the extendable web 912 remains or is locked at the desired length.

Figure 25:
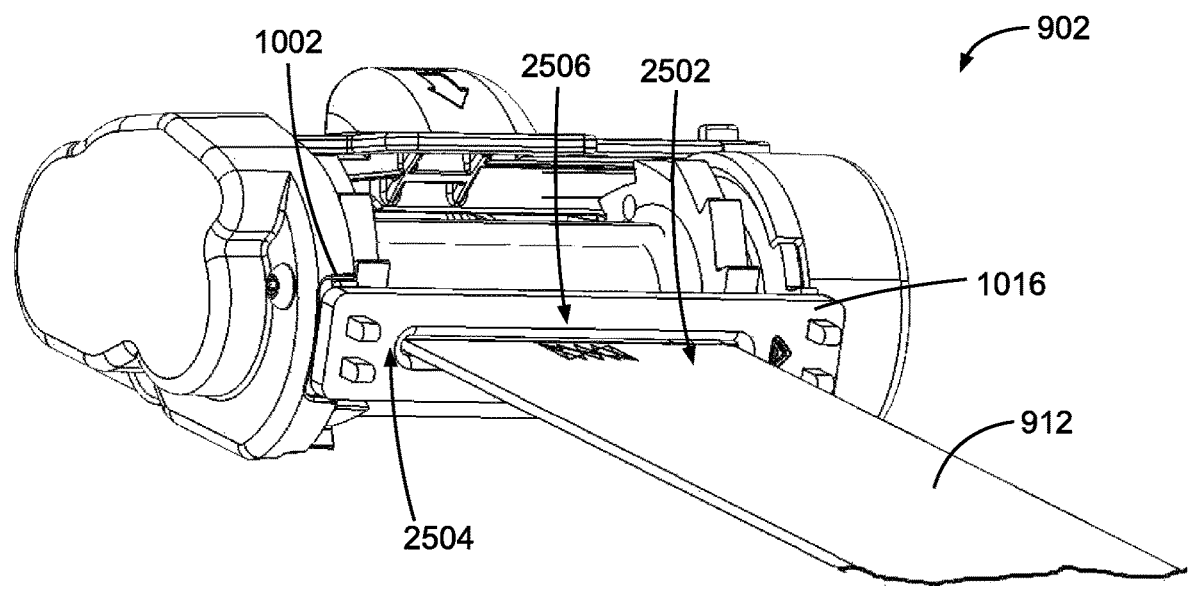
FIG. 25 is a front perspective view of the FIG. 10 retractor.
Figure 26:
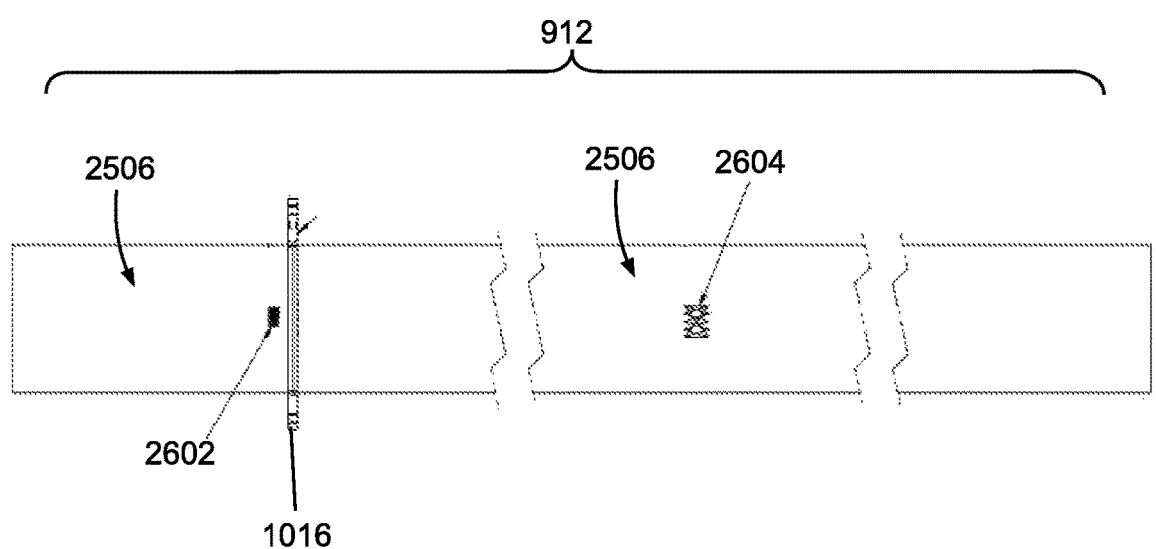
FIG. 26 is a diagram illustrating stop structures found on a web used in the FIG. 10 retractor.

Referring now to FIGS. 25 and 26, the tie bar 1016 and the extendable web 912 are designed to prevent over extension or under retraction of the extendable web 912. The tie bar 1016 defines a web slot 2502 through which the extendable web 912 extends. The web slot 2502 has a thickness 2504 that is sized to allow the extendable web 912 to smoothly slide through. The extendable web 912 has one or more stop structures 2506 that prevent over extension or retraction of the extendable web 912 relative to the retractor 902. The stop structures 2506 are especially helpful with this design of the retractor 902 because the extendable web 912 can be easily over extended or retracted by the automatic nature of the retractor 902. In the example illustrated in FIG. 26, the extendable web 912 includes at least two stop structures 2506 that prevent over extension or over retraction of the retractor double web 912. Specifically, the stop structures 2506 include an extension stop 2602 that inhibits over extension of the extendable web 912 and a retraction stop 2604 that inhibits over retraction of the extendable web 912. In the illustrated example, the stop structures 2506 are sewed patches of thread that have a thickness that is thicker than the thickness 2504 of the web slot 2502 in the tie bar 1016. When the extendable web 912 is over pulled, the extension stop 2602 wedges in the web slot 2502 to prevent further extension of the extendable web 912. Conversely, when the extendable web 912 is retracted, the retraction stop 2604 engages the tie bar 1016 so as to prevent any further retraction of the extendable web 912. While the retractors have been described with reference to securing car seats, it should be recognized that the retractors described herein can be used in other situations besides for car seats.

While the present disclosure of the retractors have been described in use with respect to child seats, myriad other applications utilizing the retractors and variations thereof, with or without a connector, are possible. Although the first and second clutches have been described as being ratchet and pawl type clutches, it should be recognized that other types of releasable one-way clutches can be used. For instance, sprag and/or overrunning clutches can be, alternatively or additionally, used for the first and/or second clutches in other examples.

While the invention has been illustrated and described in detail in the drawings and foregoing description, the same is to be considered as illustrative and not restrictive in character, it being understood that some of the embodiments have been shown and described and that all changes and modifications that come within the spirit of the invention are desired to be protected.

What is claimed is:

1. A method, comprising:
   extending a web from a retractor by actuating a release actuator and pulling on the web in an extension direction, wherein the retractor includes a first clutch and a second clutch, wherein the first clutch has an engaged state where the first clutch inhibits extension of the web and a disengaged state where the first clutch allows extension of the web, wherein the second clutch has a locked state where the second clutch inhibits retraction of the web and an unlocked state where the second clutch allows retraction of the web, wherein said actuating the release actuator places the first clutch in the disengaged state;
   storing energy in a tensioning mechanism during said extending;
   maintaining the web in an extended state from the retractor by biasing the second clutch to the locked state to inhibit retraction of the web by the tensioning mechanism;
   preventing further extension of the web by releasing the release actuator to place the first clutch in the engaged state; and
   tensioning the web with the tensioning mechanism by actuating a tension actuator to place the second clutch in the unlocked state, wherein the tension actuator is a separate component from the release actuator of the retractor.

2. The method of claim 1, wherein said actuating the release actuator causes the second clutch to move to the locked state.

3. The method of claim 1, further comprising:
   wherein a connector is attached to the web;
   attaching the connector to a bight in a vehicle during said maintaining; and
   securing a seat in the vehicle with the web by said tensioning the web.

4. The method of claim 1, wherein said tensioning the web includes releasing the energy stored in the tensioning mechanism to automatically retract the web.

5. The method of claim 4, wherein:
   the tension mechanism includes a tension spring coupled to a spool to store the energy; and
   said tensioning the web includes releasing the spring.

6. The method of claim 1, further comprising:
wherein said maintaining the web in the extended state includes biasing the first clutch to remain at the engaged state unless a release actuator is actively actuated; and
actuating the release actuator to change the first clutch to the disengaged state.

7. The method of claim 1, wherein:
the first clutch includes a ratchet mechanism that includes one or more ratchet teeth extending from a spool, a pawl, and a pawl bias spring; and
said preventing further extension includes
engaging the pawl with the ratchet teeth, and
biasing the pawl with the pawl bias spring to remain engaged with the ratchet teeth.

8. The method of claim 7, further comprising:
pressing a pawl engagement member against the pawl to move the pawl out of engagement with the ratchet teeth when the release actuator is actuated.

9. The method of claim 1, wherein:
the release actuator includes a release button; and
the tension actuator includes a tighten button.

10. The method of claim 1, further comprising:
wherein the second clutch includes a ratchet mechanism;
wherein the ratchet mechanism includes a ratchet spool connected to one end of the spool;
wherein the ratchet spool has one or more ratchet teeth; and
engaging a toggle pawl to the one or more ratchet teeth of the ratchet spool.

11. The method of claim 10, further comprising:
biasing a toggle pawl bias spring to bias the toggle pawl at both the locked state and the unlocked state.

12. The method of claim 11, wherein:
pivoting the toggle pawl with a lock toggle member of the release actuator to the locked state where the toggle pawl engages the one or more ratchet teeth of the ratchet spool; and
pivoting the toggle pawl with an unlock toggle member of the tension actuator to the unlocked state where the toggle pawl disengages from the one or more ratchet teeth of the ratchet spool.

13. The method of claim 12, further comprising:
wherein the release actuator includes a body to which the toggle pawl is pivotally coupled;
wherein the body defines a guide notch in which the unlock toggle member is received to guide the unlock toggle member; and
limiting movement of the pawl with a stop member of the body when in the unlocked state.

14. The method of claim 12, wherein the release actuator includes a pawl engagement member positioned to actuate the first clutch to the disengaged state when the release actuator is actuated.

15. The method of claim 1, further comprising
wherein the release actuator includes a pawl engagement member and a lock toggle member;
actuating the pawl engagement member to actuate the first clutch to the disengaged state when the release actuator is actuated; and
actuating the lock toggle member to actuate the second clutch to the locked state when the release actuator is actuated.

16. The method of claim 1, further comprising:
wherein the retractor includes a tie bar defining a web slot through which the web extends;
limiting extension of the web by engaging an extension stop structure of the web to the tie bar; and
limiting retraction of the web by engaging a retraction stop structure of the web to the tie bar.

17. The method of claim 1, further comprising:
wherein a stationary web between the retractor and a stationary connector has a fixed length;
wherein the web has an extendable connector attached to an end of the web opposite the retractor;
securing the stationary connector to a first bight before said extending the web from the retractor; and
securing the extendable connector to a second bight after said extending the web from the retractor.

18. The method of claim 17, wherein the fixed length of the stationary web is shorter than a length of the web after said tensioning the web.

19. The method of claim 17, wherein said securing the extendable connector occurs during said maintaining the web in the extended state.

* * * * *